US012580499B2

(12) United States Patent
Chee et al.

(10) Patent No.: US 12,580,499 B2
(45) Date of Patent: Mar. 17, 2026

(54) DISPLACEMENT MAGNIFYING MECHANISM, ACTUATOR, POLISHING DEVICE, ELECTRONIC COMPONENT PROCESSING APPARATUS, DISPENSER, AND AIR VALVE

(71) Applicants: Mechano Transformer Corporation, Tokyo (JP); SATAKE CORPORATION, Tokyo (JP)

(72) Inventors: Sze Keat Chee, Tokyo (JP); Takeshi Yano, Tokyo (JP); Akio Yano, Tokyo (JP)

(73) Assignees: Mechano Transformer Corporation, Tokyo (JP); SATAKE CORPORATION, Tokyo (JP)

( * ) Notice: Subject to any disclaimer, the term of this patent is extended or adjusted under 35 U.S.C. 154(b) by 848 days.

(21) Appl. No.: 17/791,435

(22) PCT Filed: Jan. 7, 2021

(86) PCT No.: PCT/JP2021/000411
§ 371 (c)(1),
(2) Date: Jul. 7, 2022

(87) PCT Pub. No.: WO2021/141095
PCT Pub. Date: Jul. 15, 2021

(65) Prior Publication Data
US 2023/0043346 A1     Feb. 9, 2023

(30) Foreign Application Priority Data
Jan. 8, 2020     (WO) .................. PCT/JP2020/000358

(51) Int. Cl.
*H02N 2/04*          (2006.01)
*B24B 31/00*         (2006.01)
(Continued)

(52) U.S. Cl.
CPC ........... *H02N 2/043* (2013.01); *B24B 31/003* (2013.01); *F16K 31/007* (2013.01); *H02N 2/025* (2013.01)

(58) Field of Classification Search
CPC .... H01L 24/78; B25J 7/00; B25J 15/08; B25J 15/00; B25J 11/0095; B25J 19/028; B24B 37/345
See application file for complete search history.

(56) References Cited

U.S. PATENT DOCUMENTS

2012/0049552 A1*  3/2012  Chen .......................... B25J 7/00
                                                                294/86.4
2016/0023298 A1*  1/2016  Song ...................... H01L 24/85
                                                                228/1.1
(Continued)

FOREIGN PATENT DOCUMENTS

EP         0416551 A2     3/1991
ES         2575919 T3 *   7/2016   .......... B25J 15/0028
(Continued)

OTHER PUBLICATIONS

Office Action mailed Sep. 4, 2024 in Taiwanese Application No. 11320911350.
(Continued)

*Primary Examiner* — Joel D Crandall
(74) *Attorney, Agent, or Firm* — Miles & Stockbridge, P.C.

(57)          ABSTRACT
A displacement magnifying mechanism, polishing device, actuator, electronic component processing apparatus, dispenser, and air valve which can easily control a drive system. The displacement magnifying mechanism includes a base; a piezoelectric element of which an end is attached to a mounting surface of the base, the piezoelectric element extending along a first longitudinal direction; a support member of which an end is attached to the mounting surface
(Continued)

side by side with the piezoelectric element, the support member extending along a second longitudinal direction which intersects with the first longitudinal direction; an operating portion attached to each of other ends of the piezoelectric element and the support member to allow the operating portion to be displaced, in response to an expansion/contraction of the piezoelectric element, along a displacement direction; and a compression member attached to the base and the operating portion so as to compress the piezoelectric element.

20 Claims, 27 Drawing Sheets

(51) Int. Cl.
    *F16K 31/00*         (2006.01)
    *H02N 2/02*         (2006.01)

(56)            References Cited

U.S. PATENT DOCUMENTS

| | | | |
|---|---|---|---|
| 2017/0254430 A1 | 9/2017 | Hirata et al. | |
| 2018/0034387 A1 * | 2/2018 | Arakawa | B65G 47/901 |
| 2019/0264827 A1 | 8/2019 | Irie | |
| 2020/0144477 A1 * | 5/2020 | Chee | F16K 31/004 |

FOREIGN PATENT DOCUMENTS

| | | | | |
|---|---|---|---|---|
| JP | H11328890 A | | 11/1999 | |
| JP | 3103467 U | | 8/2004 | |
| JP | 2007154965 A | | 6/2007 | |
| JP | 2012-139028 A | | 7/2012 | |
| JP | 2015177720 A | | 10/2015 | |
| JP | 201634225 A | | 3/2016 | |
| JP | 2018-202312 A | | 12/2018 | |
| JP | 2019-103193 A | | 6/2019 | |
| TW | 201619534 A | | 6/2016 | |
| TW | 201818012 A | | 5/2018 | |
| WO | WO-2011135254 A1 | * | 11/2011 | B25J 15/12 |
| WO | WO-2019009035 A1 | * | 1/2019 | B24B 1/00 |

OTHER PUBLICATIONS

Office Action mailed Oct. 8, 2024 in Japanese Application No. 2021-570093.
Office Action mailed Dec. 5, 2023 in Japanese Application No. 2021-167612.
Notice of reasons for refusal issued in JP Application No. 2020-550197, mailed on Dec. 22, 2020.
Decision of Refusal issued in JP Application No. 2020-550197, mailed on Jul. 13, 2021.
International Search Report issued in Intl. Appln. No. PCT/JP2020/000358, mailed on Mar. 24, 2020.
International Search Report issued in Intl. Appln. No. PCT/JP2021/000411, mailed on Mar. 30, 2021.
Office Action mailed Jan. 28, 2025 in Indian Application No. 202227031498.

* cited by examiner

DRIVE PORTION — 80

FIG. 23

DISPLACEMENT MAGNIFYING MECHANISM, ACTUATOR, POLISHING DEVICE, ELECTRONIC COMPONENT PROCESSING APPARATUS, DISPENSER, AND AIR VALVE

CROSS-REFERENCE TO RELATED APPLICATIONS

This application claims priority to PCT International Patent Application No. PCT/JP2020/000358, filed on Jan. 8, 2020 to Japanese Patent Office as Receiving Office, under the title of "DISPLACEMENT MAGNIFYING MECHANISM, ACTUATOR, POLISHING DEVICE, ELECTRONIC COMPONENT PROCESSING APPARATUS, DISPENSER, AND AIR VALVE," the content of which is incorporated herein by reference in its entirety.

FIELD OF THE INVENTION

The present invention relates to a displacement magnifying mechanism, an actuator, a polishing device, an electronic component processing apparatus, a dispenser, and an air valve.

BACKGROUND OF THE INVENTION

Traditionally, a piezoelectric element (piezo element) has been known as an element which can generate a required displacement at a relatively low voltage. The piezoelectric element has a structure in which substances having a piezoelectric effect and thin electrodes are alternately laminated. The piezoelectric element is configured as an element which has a function of converting a force into a voltage or converting a voltage into a force.

The piezoelectric element is allowed to generate an expansion/contraction change delicately by controlling the voltage. Thus, the piezoelectric element is used in various fields such as an ink ejection mechanism of an inkjet printer, a control mechanism of an actuator or the like.

The piezoelectric element is configured to generate an expansion/contraction when a voltage is applied thereto, but an amount of the generated displacement is small. Therefore, a displacement magnifying mechanism is used in order to magnify the displacement of the expansion/contraction of the piezoelectric element for exerting on a target object.

Patent Document 1 discloses a displacement magnifying mechanism which is configured to displace two piezoelectric elements in order to effectively increase an amount of the displacement to output.

PATENT DOCUMENTS

[Patent Document 1] WO 2019/009035 A1

SUMMARY OF THE INVENTION

According to the displacement magnifying mechanism described in Patent Document 1, two piezoelectric elements are used. Therefore, it is required to control driving of each of the piezoelectric elements. As a result, the control of the drive system for obtaining a desired displacement becomes complex.

The present invention provides a displacement magnifying mechanism, a polishing device, an actuator, an electronic component processing apparatus, a dispenser, and an air valve which can easily control the drive system.

A displacement magnifying mechanism according to the present invention includes a base portion adapted for serving as a base; a piezoelectric element of which an end portion is attached to a mounting surface of the base portion, the piezoelectric element extending along a first longitudinal direction; a support member of which an end portion is attached to the mounting surface side by side with the piezoelectric element, the support member extending along a second longitudinal direction which intersects with the first longitudinal direction; an operating portion attached to each of other end portions of the piezoelectric element and the support member to allow the operating portion to be displaced, in response to an expansion/contraction of the piezoelectric element, along a displacement direction which differs from both the first longitudinal direction and the second longitudinal direction; and a compression member attached to each of the base portion and the operating portion so as to compress the piezoelectric element along the first longitudinal direction.

In addition, a rigidity of the piezoelectric element along the first longitudinal direction may be equal to or less than a rigidity of the support member along the second longitudinal direction.

In addition, a connecting member may be provided for connecting the end portion of the piezoelectric element and the base portion, and the connecting member may be formed with a material of which a thermal expansion coefficient is higher than that of the support member.

In addition, the connecting member may be integrally formed with the base portion.

In addition, a connecting member may be provided for connecting the other end portion of the piezoelectric element and the operating portion, and the connecting member may be formed with a material of which a thermal expansion coefficient is higher than that of the support member.

In addition, the connecting member may be integrally formed with the operating portion.

In addition, a rigidity of the support member along the displacement direction may be equal to or less than a rigidity of the piezoelectric element along the displacement direction.

In addition, in a cross section of the support member as viewed from the second longitudinal direction, a cross-sectional secondary moment about a central axis which is perpendicular to the displacement direction and passes through a center of the support member along the displacement direction may differ depending on a position along the second longitudinal direction.

In addition, a hinge member may be provided at least at one of the end portion of the piezoelectric element along the first longitudinal direction and the end portion of the support member along the second longitudinal direction so as to promote a deformation of the piezoelectric element and the support member along the displacement direction.

In addition, a hinge member may be provided at least at one of the other end portion of the piezoelectric element along the first longitudinal direction and the other end portion of the support member along the second longitudinal direction so as to promote a deformation of the piezoelectric element and the support member along the displacement direction.

In addition, two compression members may be respectively disposed at positions sandwiching the piezoelectric element and the support member therebetween.

In addition, the compression member may extend along a third longitudinal direction which intersects with each of the first longitudinal direction and the second longitudinal direction when viewed in a plan view including the first longitudinal direction and the second longitudinal direction, and the compression member may be formed to be provided with an expansible member which is able to expand/contract along the third longitudinal direction.

In addition, at least one of the compression members may extend along the first longitudinal direction, and the compression member extending along the first longitudinal direction may be formed to be provided with an expansible member which is able to expand/contract along the first longitudinal direction.

In addition, a polishing device according to the present invention includes a base portion adapted for serving as a base; a piezoelectric element of which an end portion is attached to a mounting surface of the base portion, the piezoelectric element extending along a first longitudinal direction; a support member of which an end portion is attached to the mounting surface side by side with the piezoelectric element, the support member extending along a second longitudinal direction which intersects with the first longitudinal direction; an operating portion attached to each of other end portions of the piezoelectric element and the support member to allow the operating portion to be displaced, in response to an expansion/contraction of the piezoelectric element, along a displacement direction which differs from both the first longitudinal direction and the second longitudinal direction; a compression member attached to each of the base portion and the operating portion so as to compress the piezoelectric element along the first longitudinal direction; and a polishing portion provided on a surface of the operating portion opposite to a surface to which the piezoelectric element and the support member are attached.

In addition, an actuator according to the present invention includes a base portion adapted for serving as a base; a piezoelectric element of which an end portion is attached to a mounting surface of the base portion, the piezoelectric element extending along a first longitudinal direction; a support member of which an end portion is attached to the mounting surface side by side with the piezoelectric element, the support member extending along a second longitudinal direction which intersects with the first longitudinal direction; an operating portion attached to each of other end portions of the piezoelectric element and the support member to allow the operating portion to be displaced, in response to an expansion/contraction of the piezoelectric element, along a displacement direction which differs from both the first longitudinal direction and the second longitudinal direction; a compression member attached to each of the base portion and the operating portion so as to compress the piezoelectric element along the first longitudinal direction; and a drive portion for supplying a voltage or a current to the piezoelectric element and the support member so as to generate an expansion/contraction of the piezoelectric element.

In regard to the actuator according to the present invention, the actuator may be used in an electronic component processing apparatus for processing an electronic component (for example, a chip shaped electronic component) so as to drive a working element which is adapted for processing the electronic component.

In regard to the actuator according to the present invention, the actuator may be used in a measuring device for measuring a characteristic of an electronic component and a working element may be a measuring probe for measuring a characteristic of the electronic component by contacting to the electronic component.

In regard to the actuator according to the present invention, the actuator may be used in a measuring device for measuring a characteristic of an electronic component, and a working element may be a suction nozzle for suctioning the electronic component, whereby the electronic component suctioned to the suction nozzle is brought into contact with a measuring probe for measuring the characteristic.

In regard to the actuator according to the present invention, the actuator may be used in an installing device for installing an electronic component into a carrier tape when taping the electronic component, and a working element may be a suction nozzle for suctioning the electronic component, whereby the electronic component suctioned to the suction nozzle is installed into the tape.

In addition, a dispenser according to the present invention includes a liquid discharging member for introducing a liquid therein and for discharging the introduced liquid; a valve for switching between discharging a liquid from the liquid discharging member and shutting off the discharge of the liquid; and the above-mentioned actuator for driving the valve.

In addition, an air valve according to the present invention includes a valve main body having an air pressure chamber for introducing a compressed air therein and an air outlet through which the air pressure chamber is connected to outside; a valve body provided in the air pressure chamber for switching between closing the air outlet and opening the air outlet; and the above-mentioned actuator which is provided in the air pressure chamber for driving the valve body.

Therefore, in the displacement magnifying mechanism according to the present invention, the piezoelectric element and the support member are attached to the base portion, and the operating portion is attached to them. Then, by displacing the piezoelectric element along the first longitudinal direction, it becomes possible to displace the operating portion along the displacement direction. Thus, by configuring the displacement magnifying mechanism using only one piezoelectric element, as compared with the case of using two piezoelectric elements, it becomes possible to control the drive system easily.

Furthermore, by providing a compression member in the displacement magnifying mechanism, it becomes possible to provide a preload to the piezoelectric element along a compression direction. Therefore, in regards to the piezoelectric element which is liable to be damaged due to a load exerted in a tensile direction, it becomes possible to relieve the load exerted in the tensile direction on the piezoelectric element.

BRIEF DESCRIPTION OF THE DRAWINGS

FIG. 1 is a front view illustrating an example of a displacement magnifying mechanism according to an embodiment.

FIG. 4 is a front view illustrating an example of the displacement magnifying mechanism in a condition where the compression member is not mounted.

5

Figure 6:
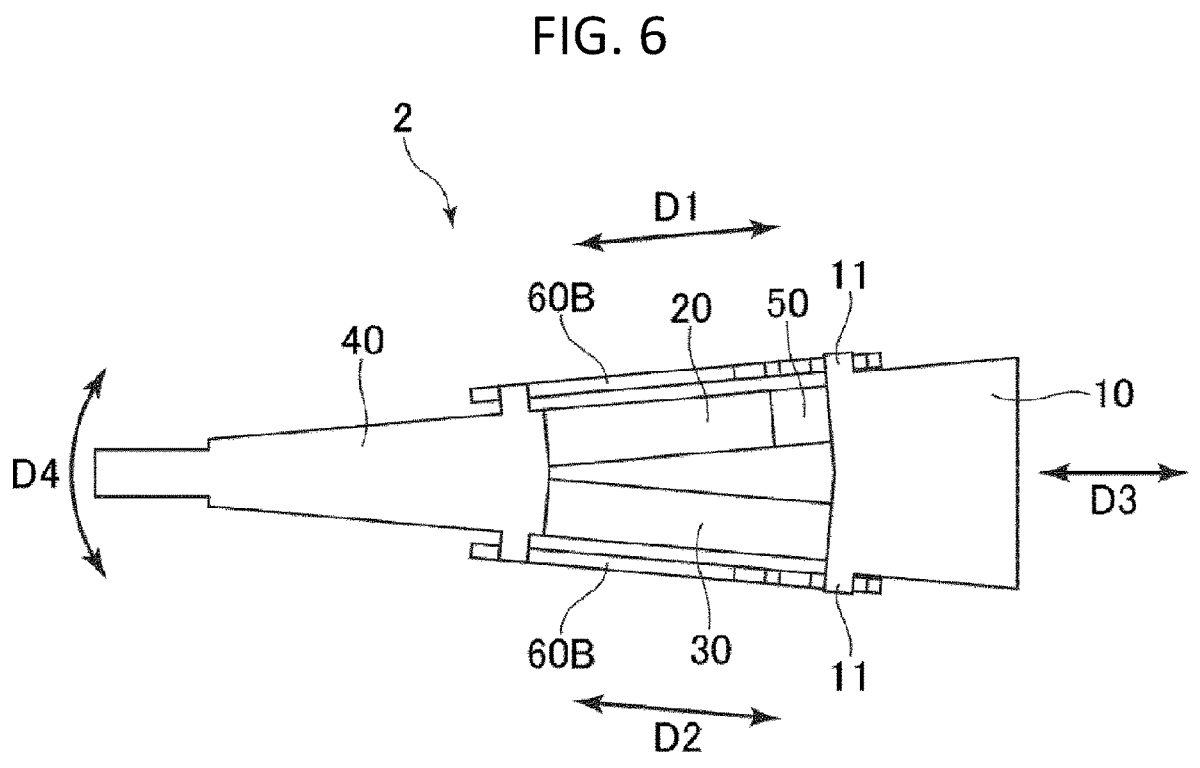

FIG. 6 is a front view illustrating an example of a displacement magnifying mechanism according to a first modification.

Figure 7:
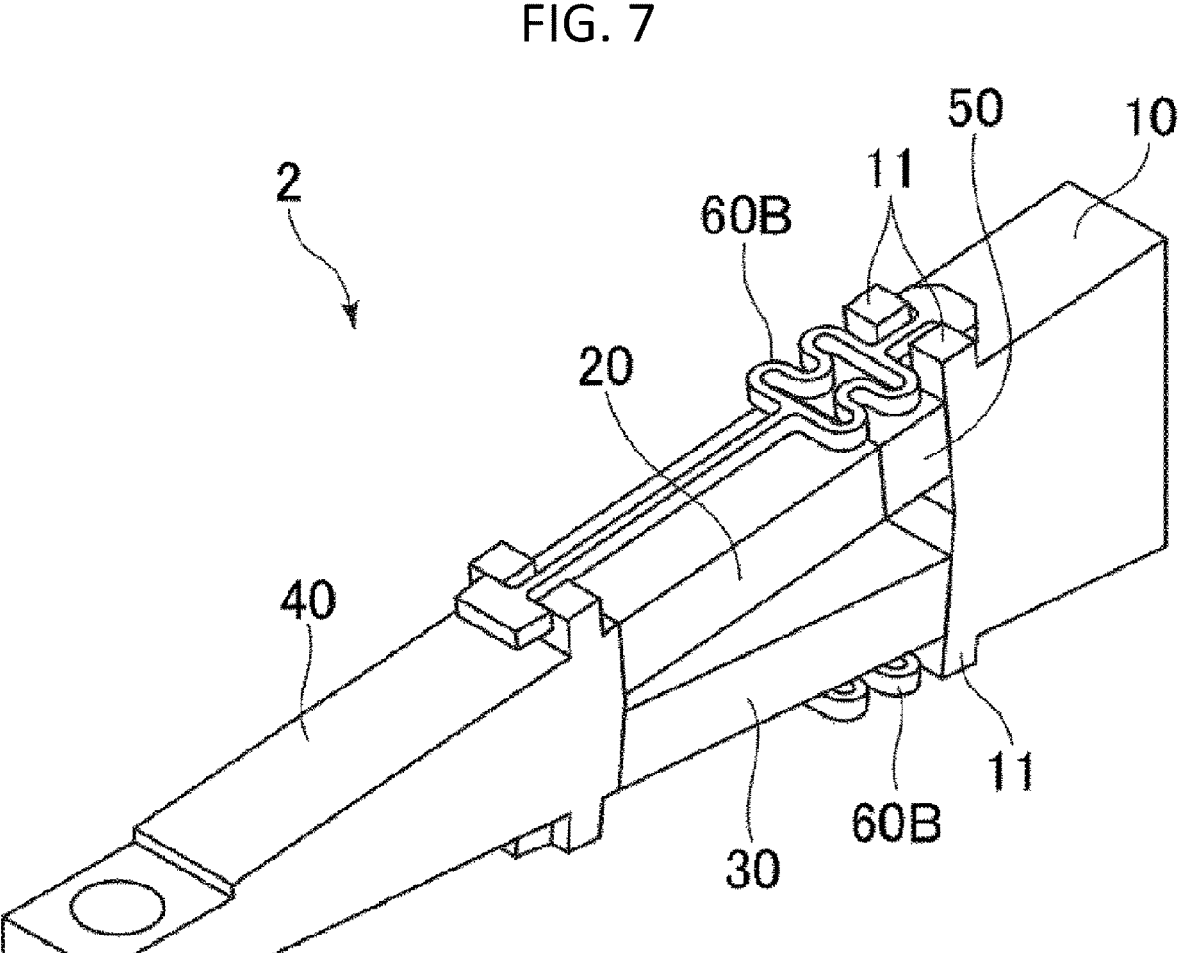

FIG. 7 is a perspective view illustrating an example of the displacement magnifying mechanism according to the first modification.

Figure 8:
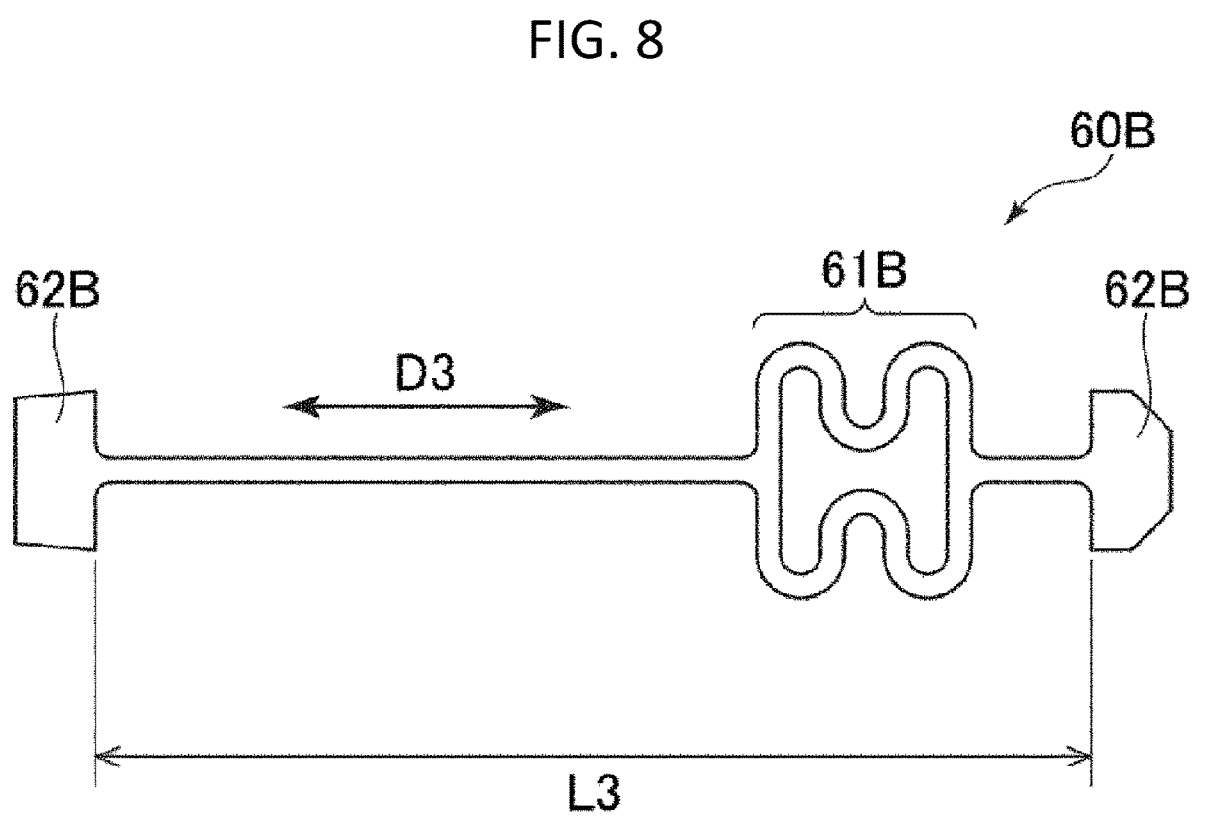

FIG. 8 is a front view illustrating an example of a compression member according to the first modification.

Figure 9:
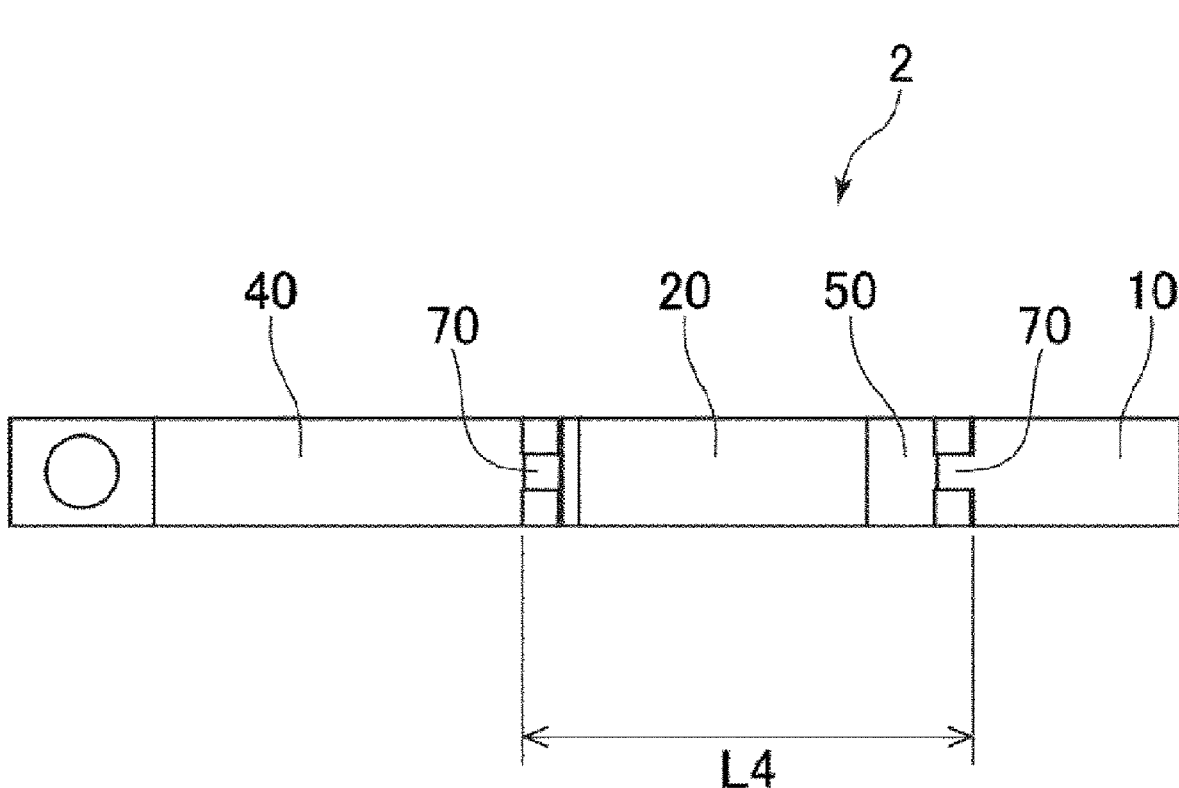

FIG. 9 is a side view illustrating an example of the displacement magnifying mechanism according to the first modification in a condition where the compression member is not mounted.

Figure 10:
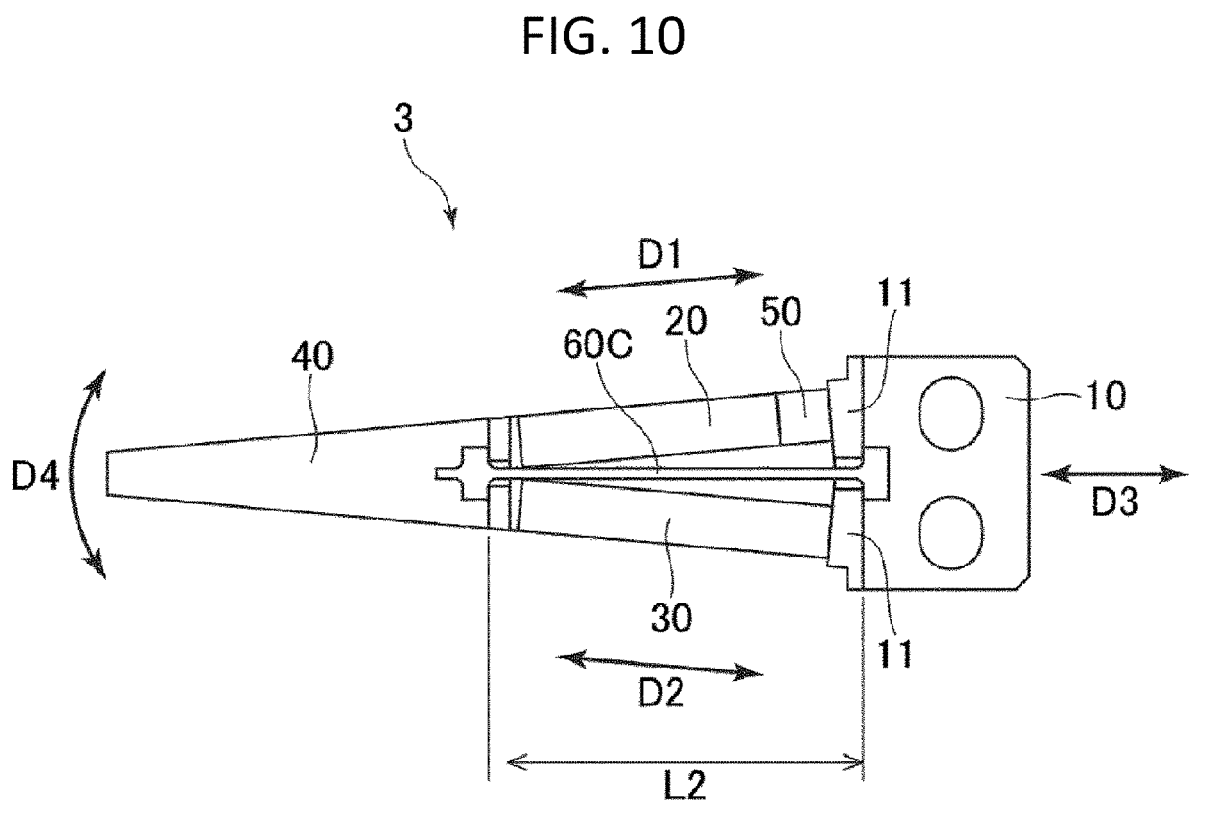

FIG. 10 is a front view illustrating an example of the displacement magnifying mechanism according to a second modification.

Figure 11:
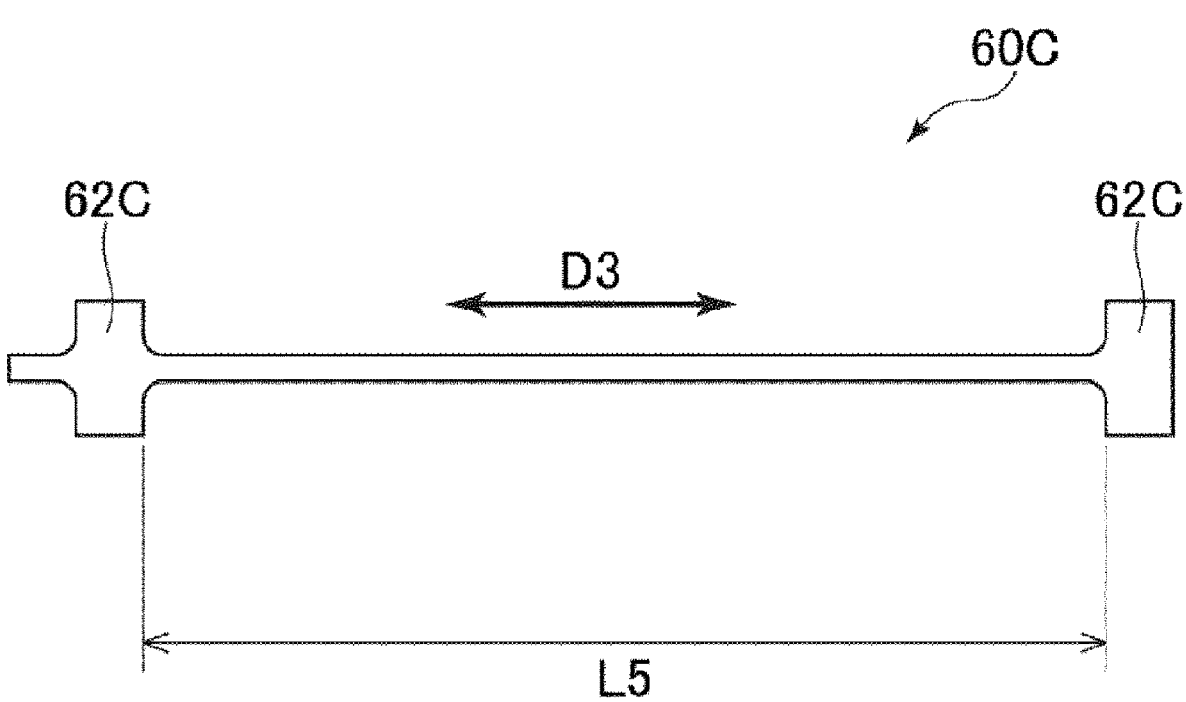

FIG. 11 is a front view illustrating an example of a compression member according to the second modification.

Figure 12:
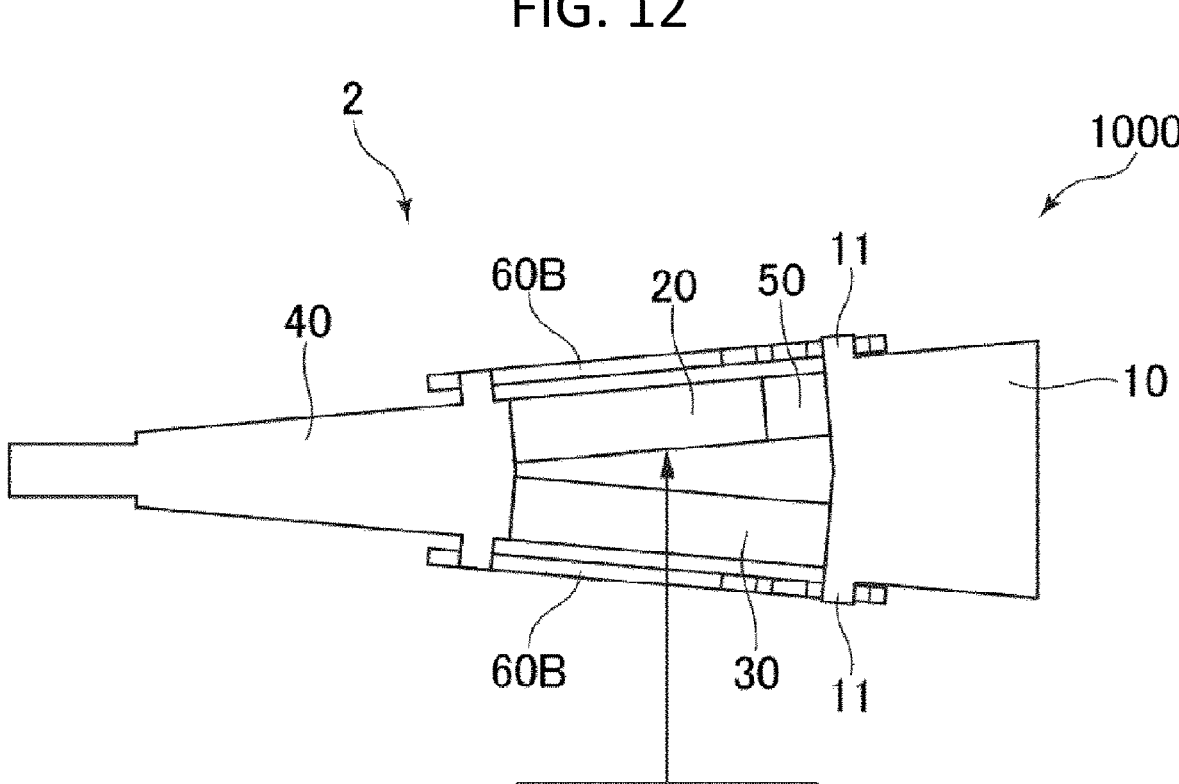

FIG. 12 is a front view illustrating an example of an actuator which uses the displacement magnifying mechanism.

Figure 13:
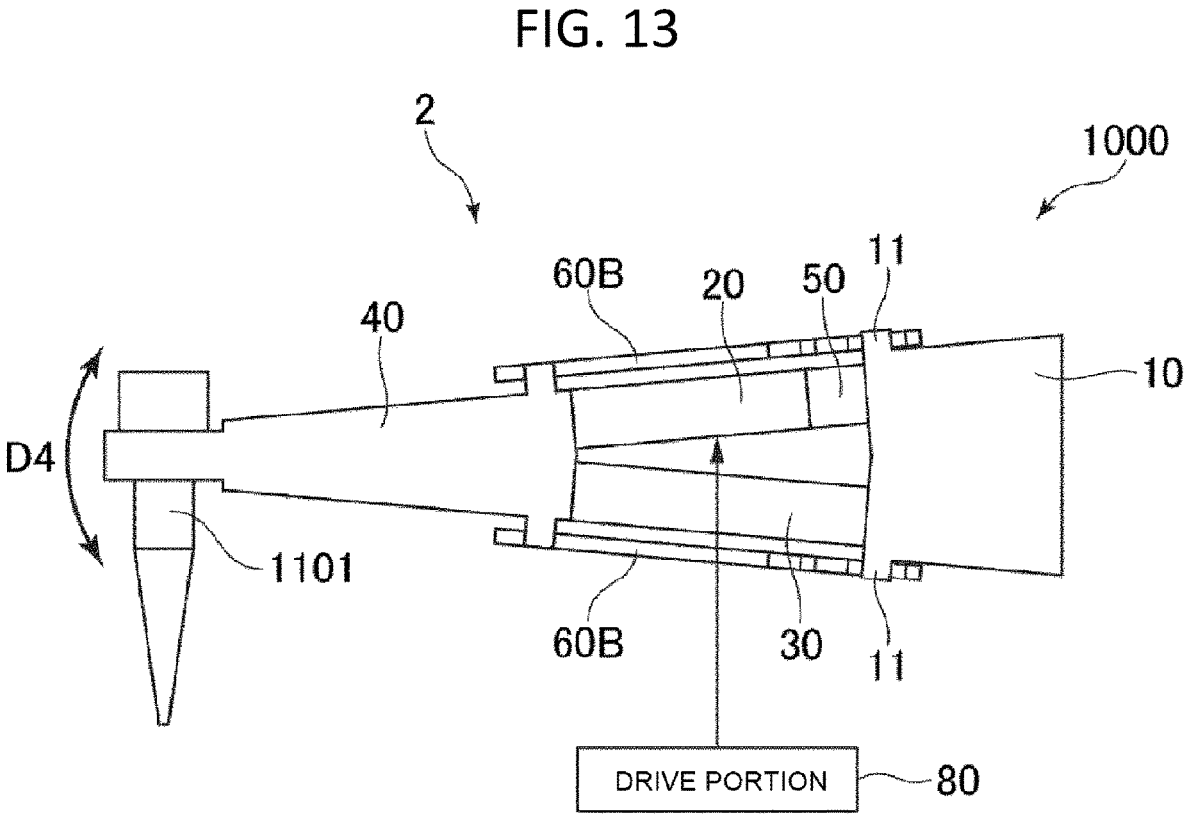

FIG. 13 is a front view illustrating an example of the actuator for displacing a measuring probe which is adapted for processing an electronic component as a working element.

Figure 14:
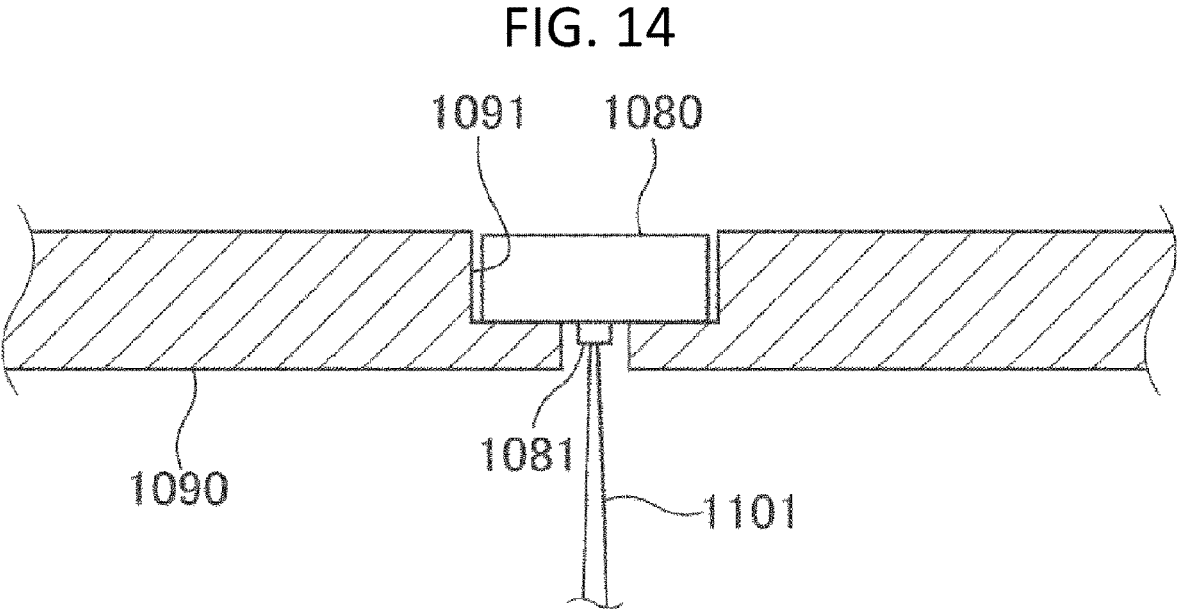

FIG. 14 illustrates an example of a condition in which an electrical characteristic of the electronic component is measured by using the measuring probe.

Figure 15:
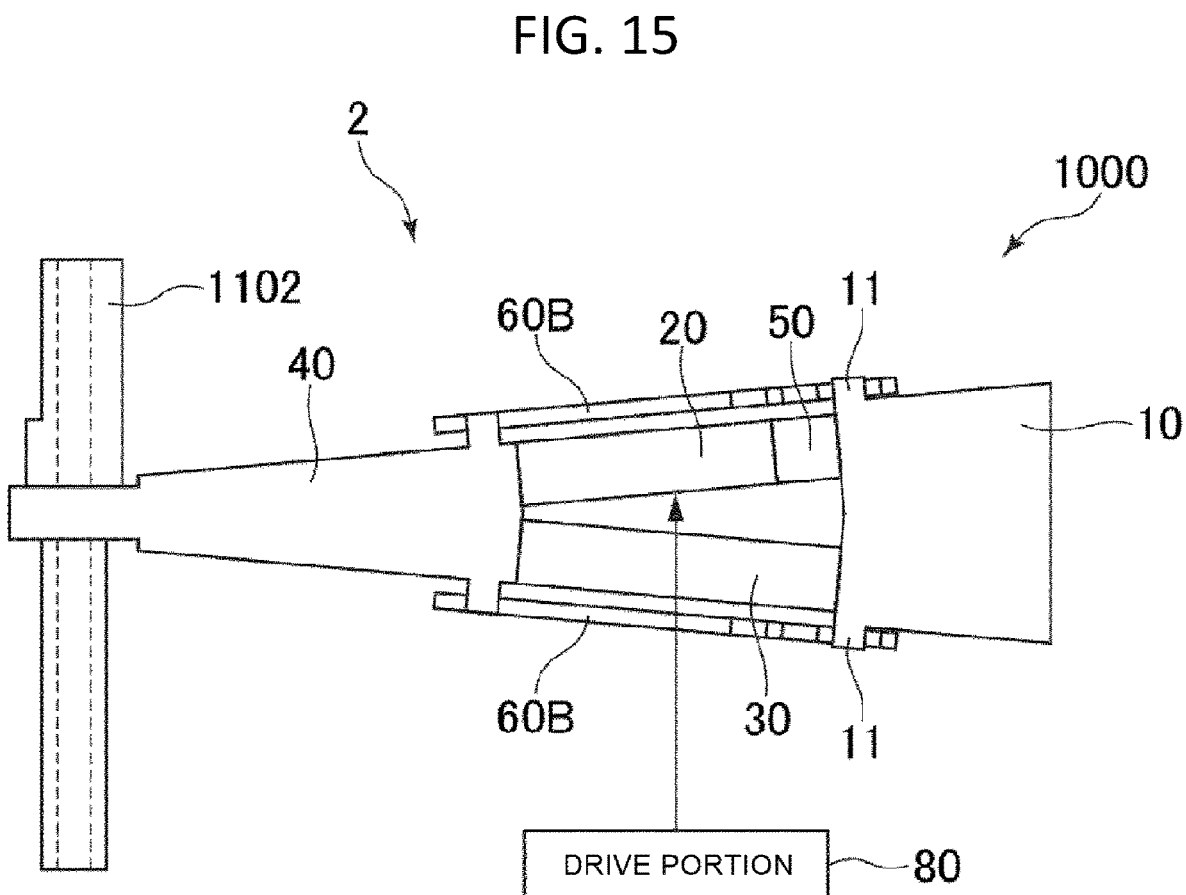

FIG. 15 is a front view illustrating another example of the actuator for displacing a suction nozzle which is adapted for processing an electronic component as a working element.

Figure 16:
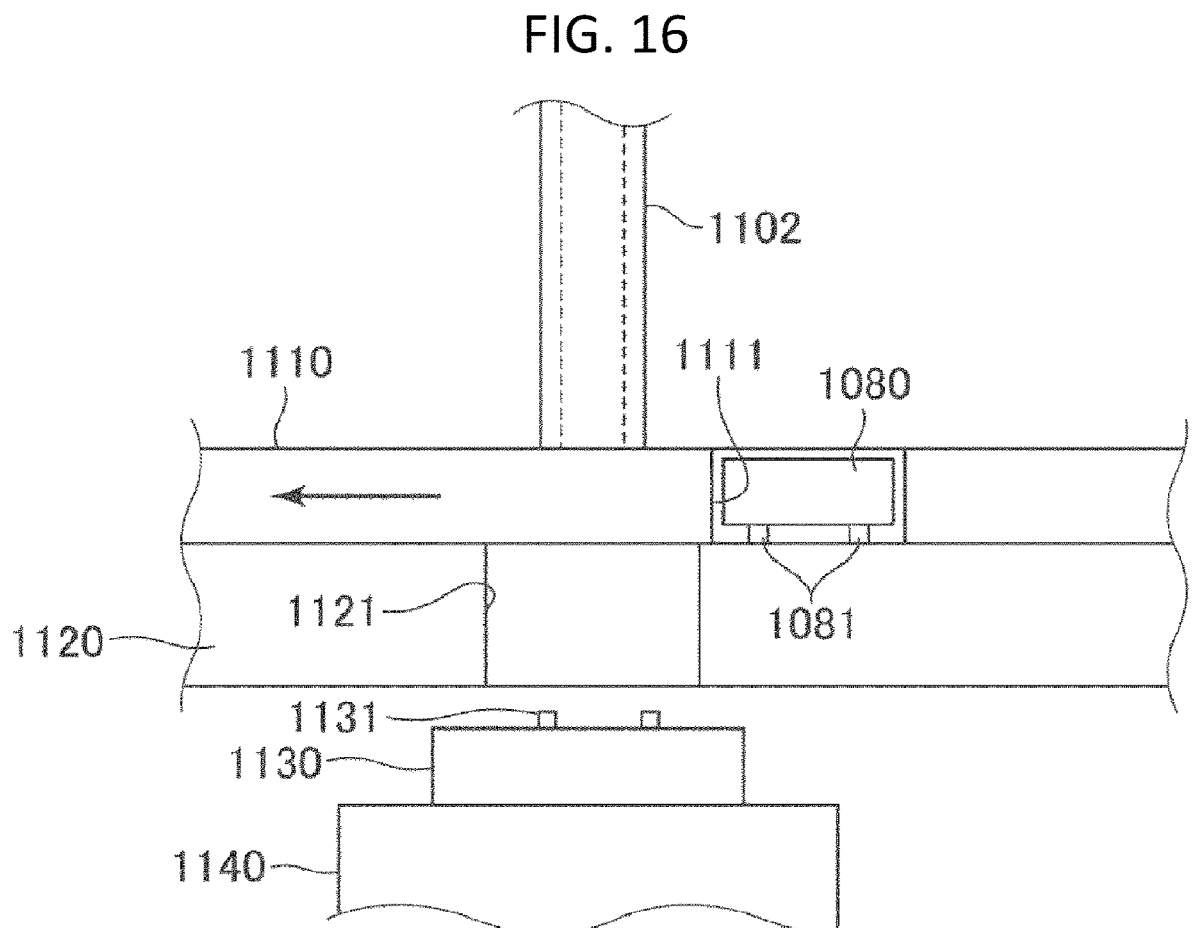

FIG. 16 illustrates an example of a measuring device for measuring an electronic component by using the actuator provided with the suction nozzle.

Figure 17:
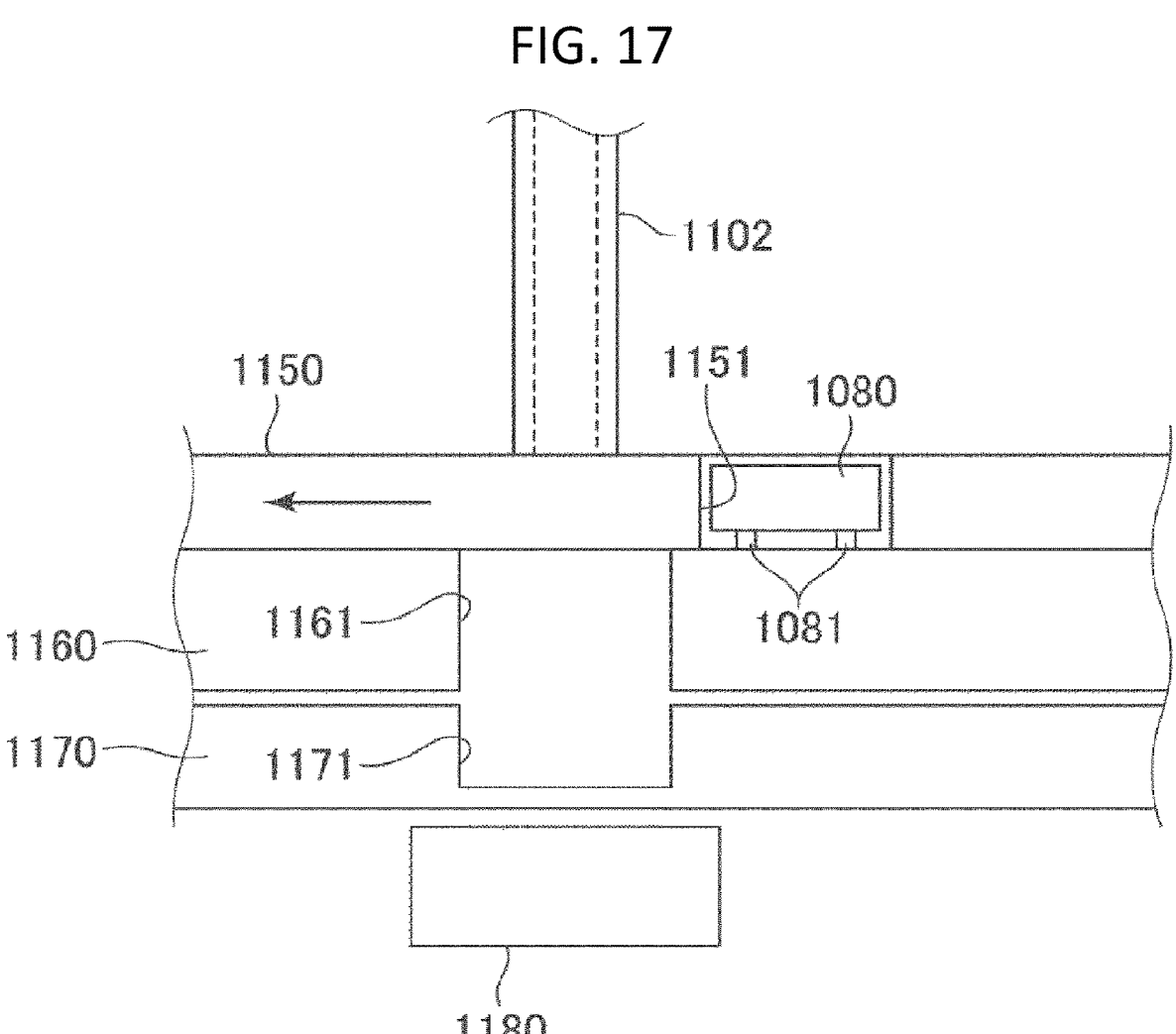

FIG. 17 illustrates an example of an installing device for installing an electronic component into a carrier tape by using the actuator provided with the suction nozzle.

Figure 18:
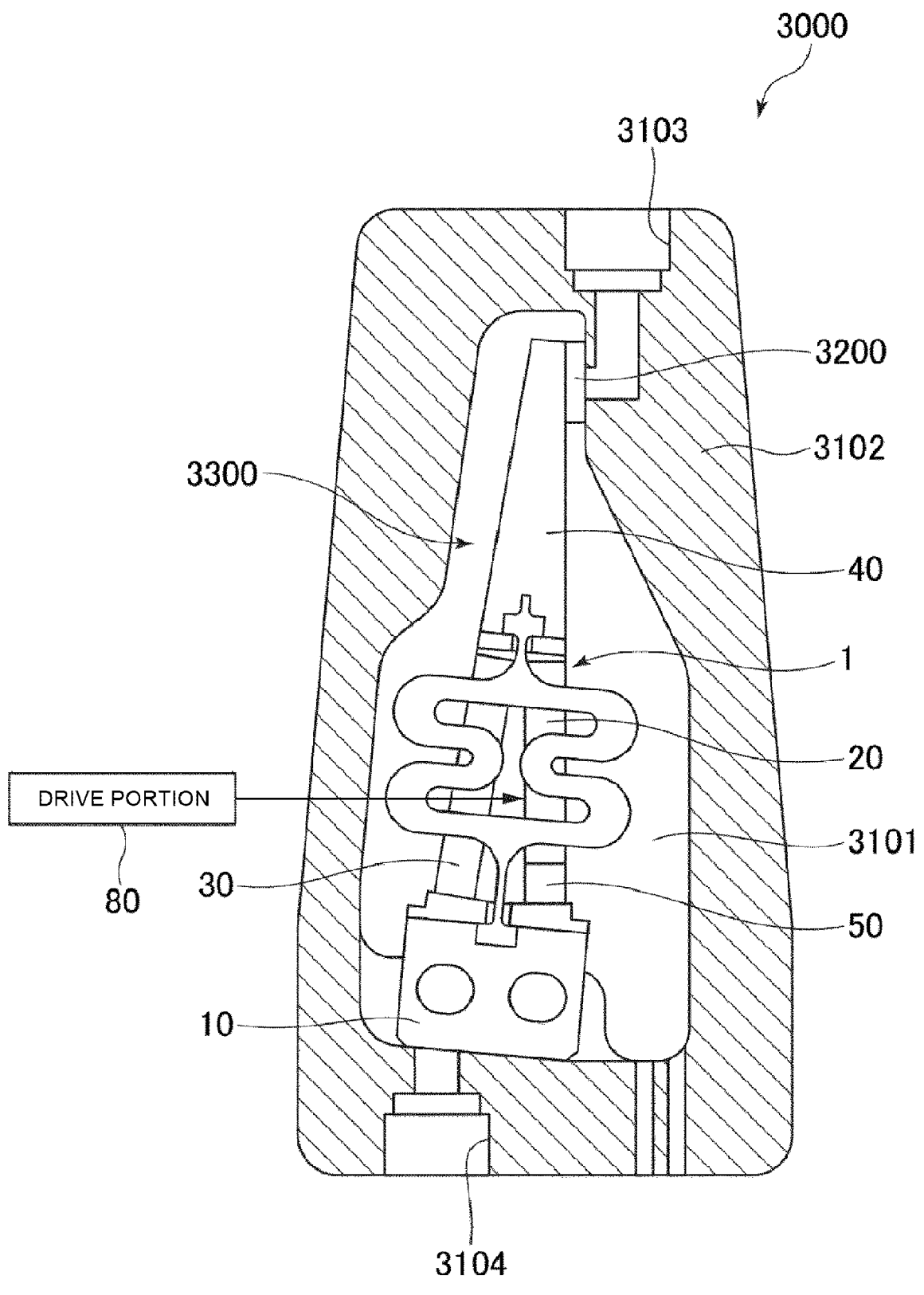

FIG. 18 is a cross-sectional view of an example of an air valve according to an embodiment.

Figure 19:
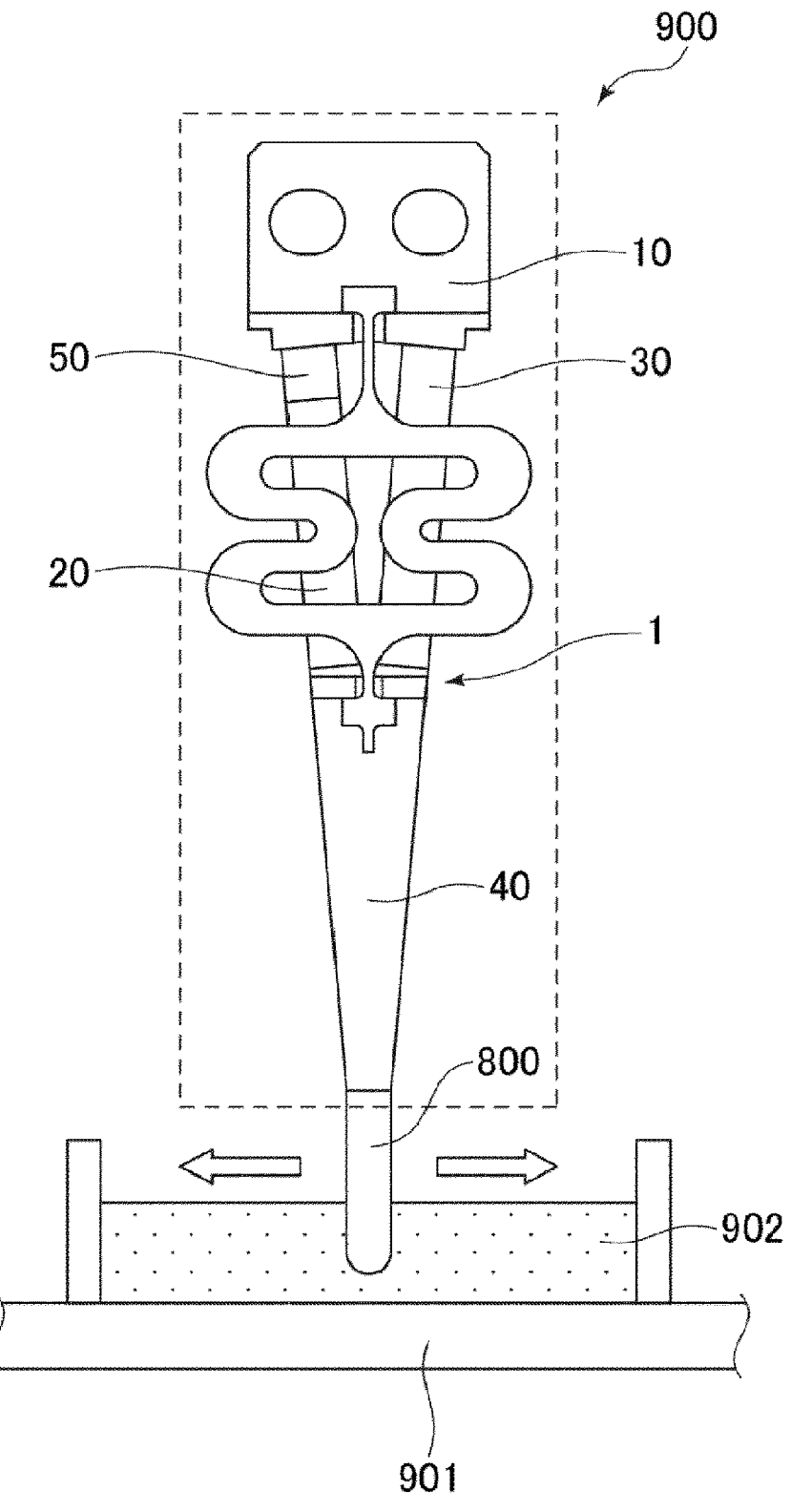

FIG. 19 is a front view of an example of a polishing device according to an embodiment.

Figure 20:
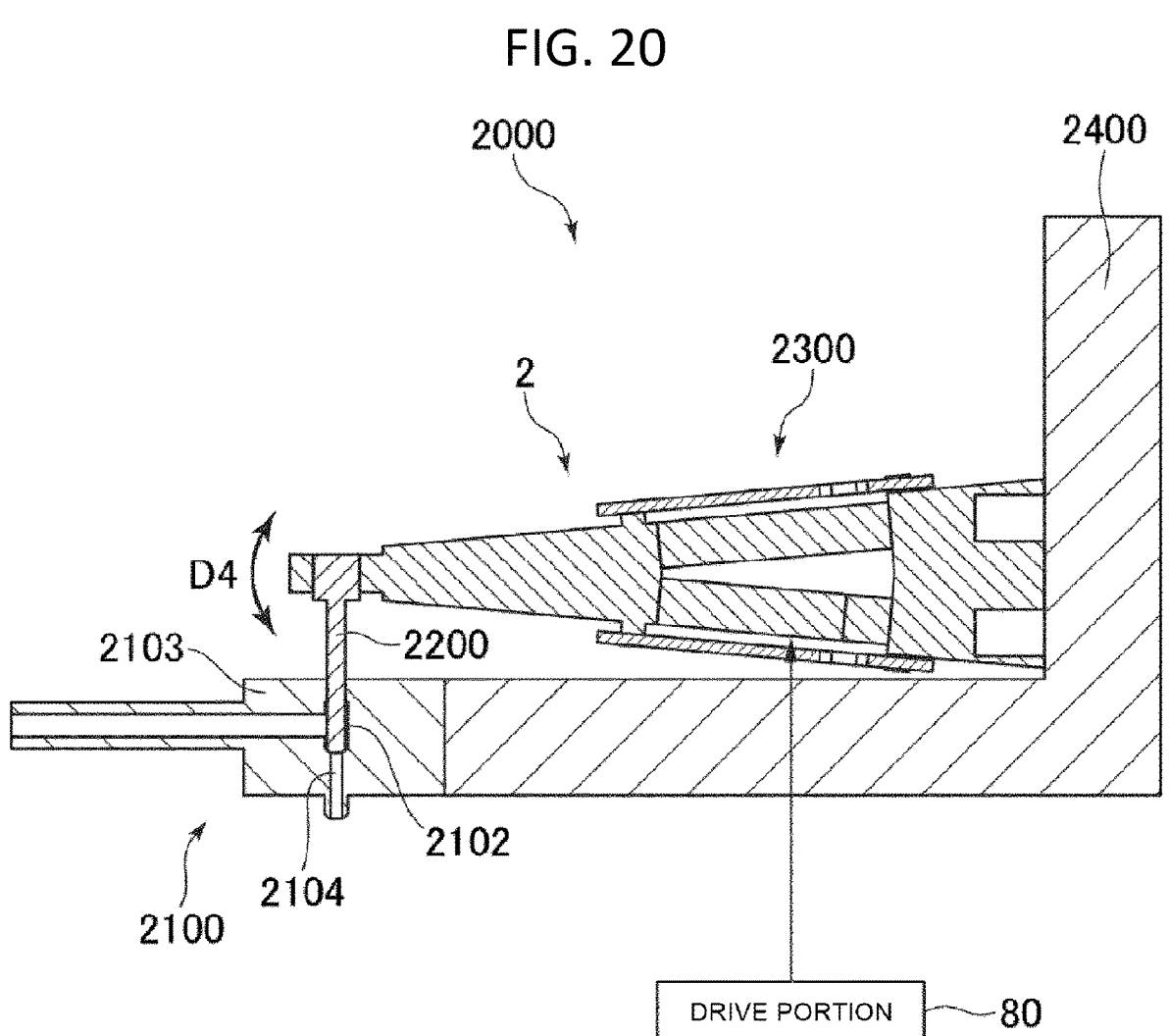

FIG. 20 is a partial front cross-sectional view of an example of a dispenser according to an embodiment.

Figure 21:
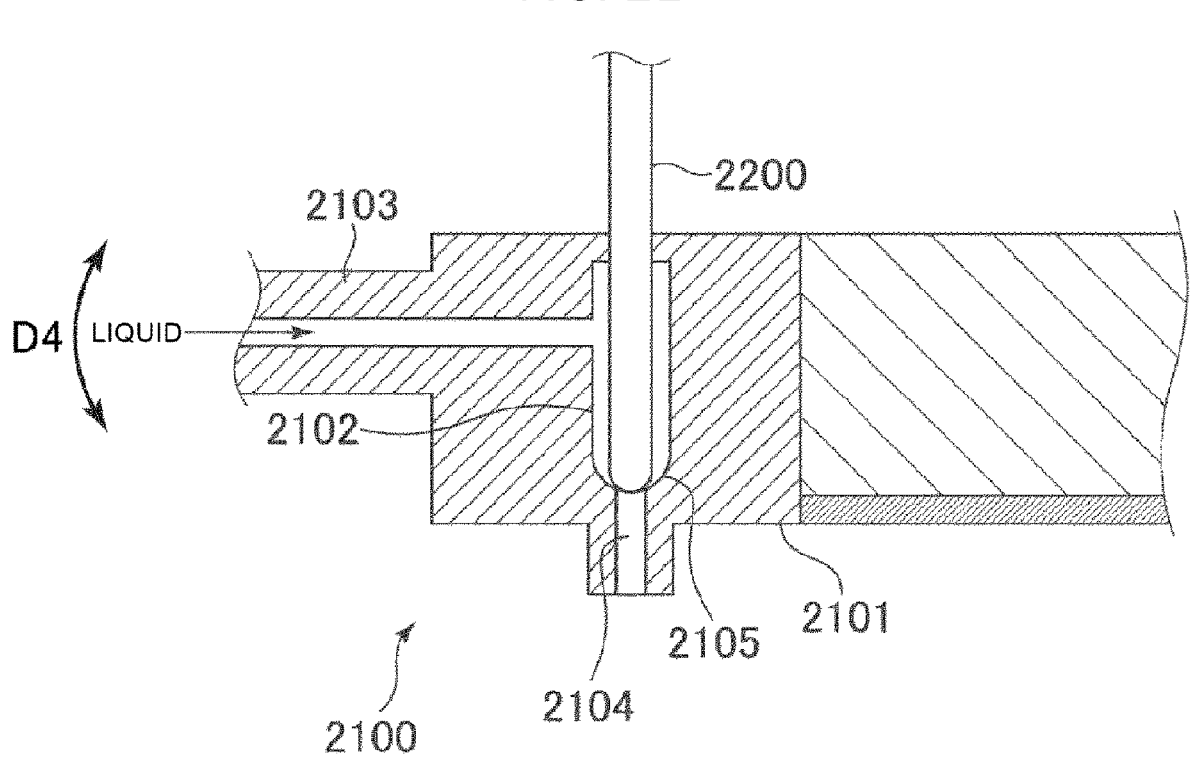

FIG. 21 is a cross-sectional view of an example of a condition where a liquid discharging member of the dispenser of FIG. 20 is closed.

Figure 22:
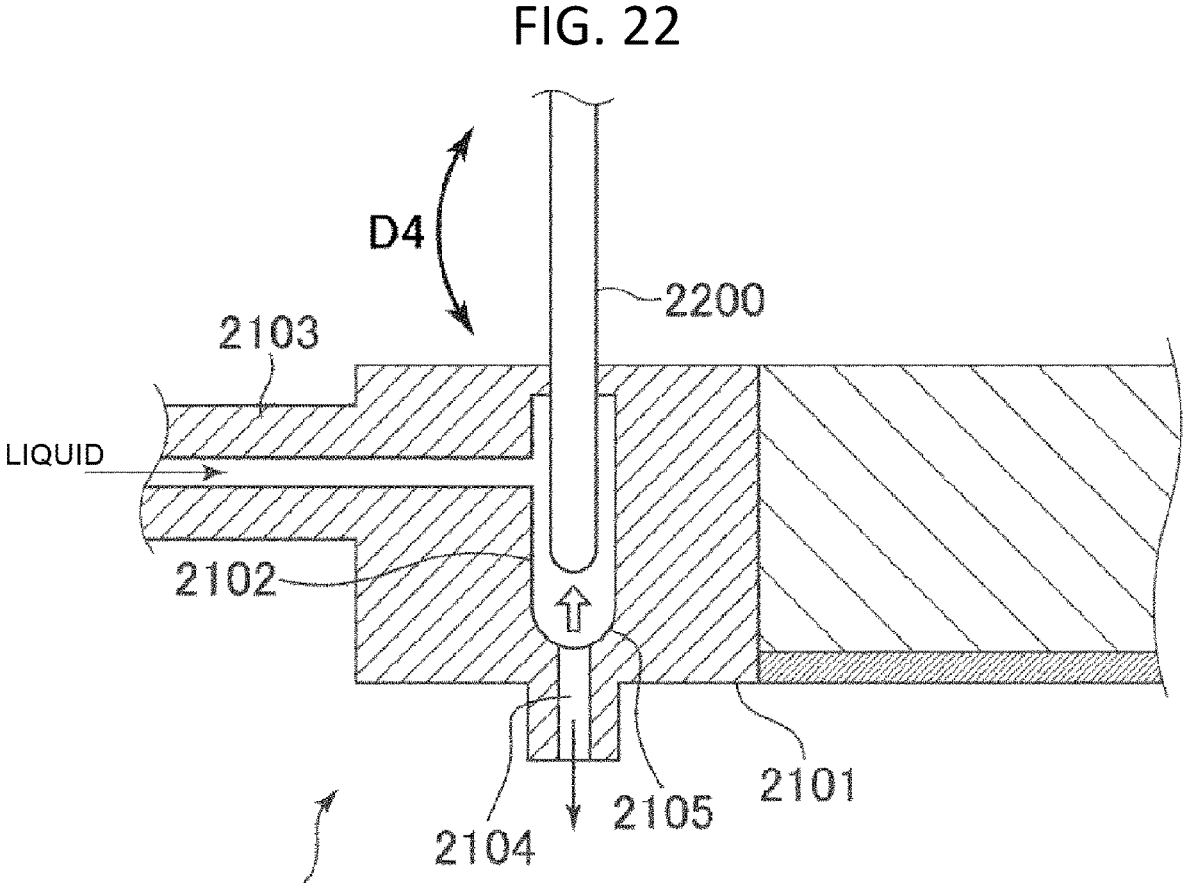

FIG. 22 is a cross-sectional view of an example of a condition where a liquid discharging member of the dispenser of FIG. 20 is opened.

Figure 23:
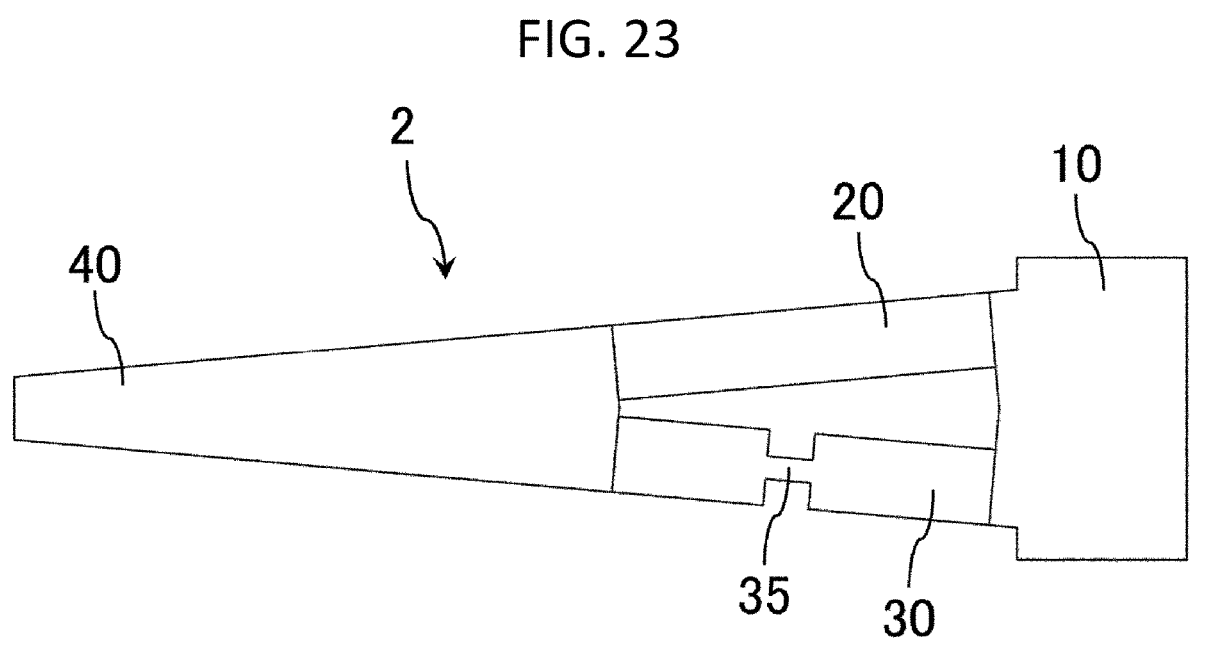

FIG. 23 illustrates a front view of an example of a displacement magnifying mechanism according to another modification.

Figures 24A, 24B:
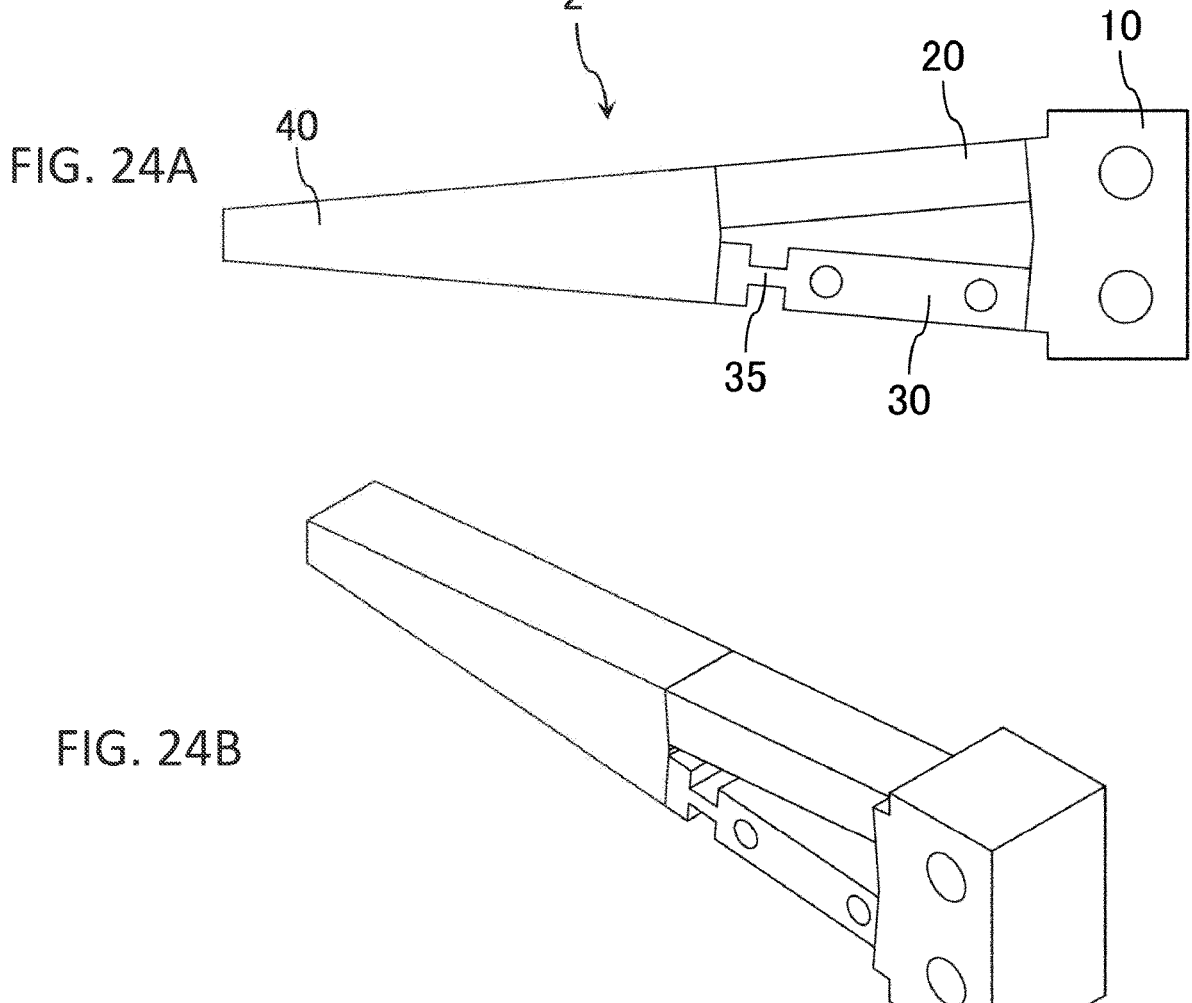
Figures 25A, 25B, 25C, 25D, 25E:
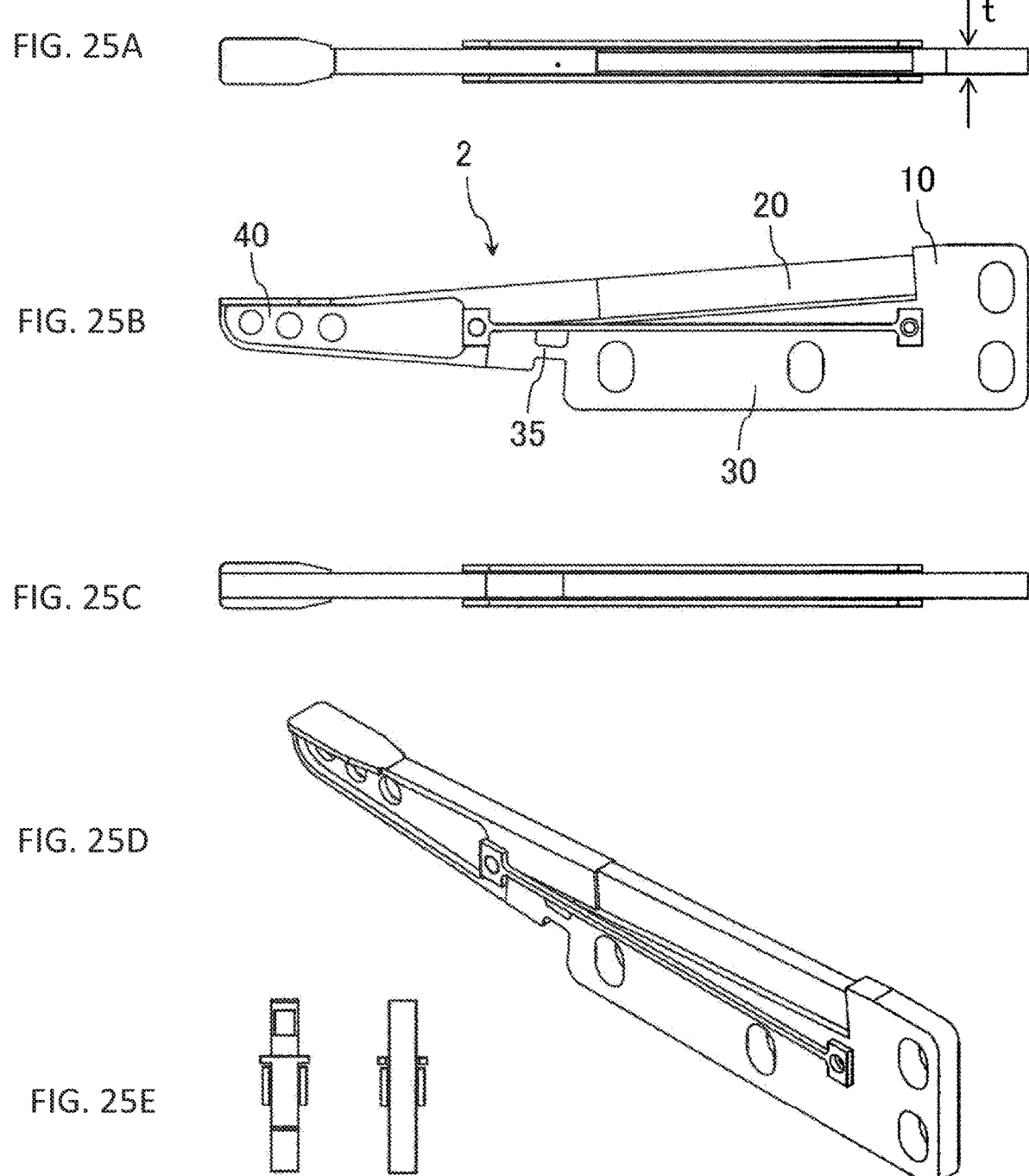
Figures 26A, 26B, 26C, 26D, 26E:
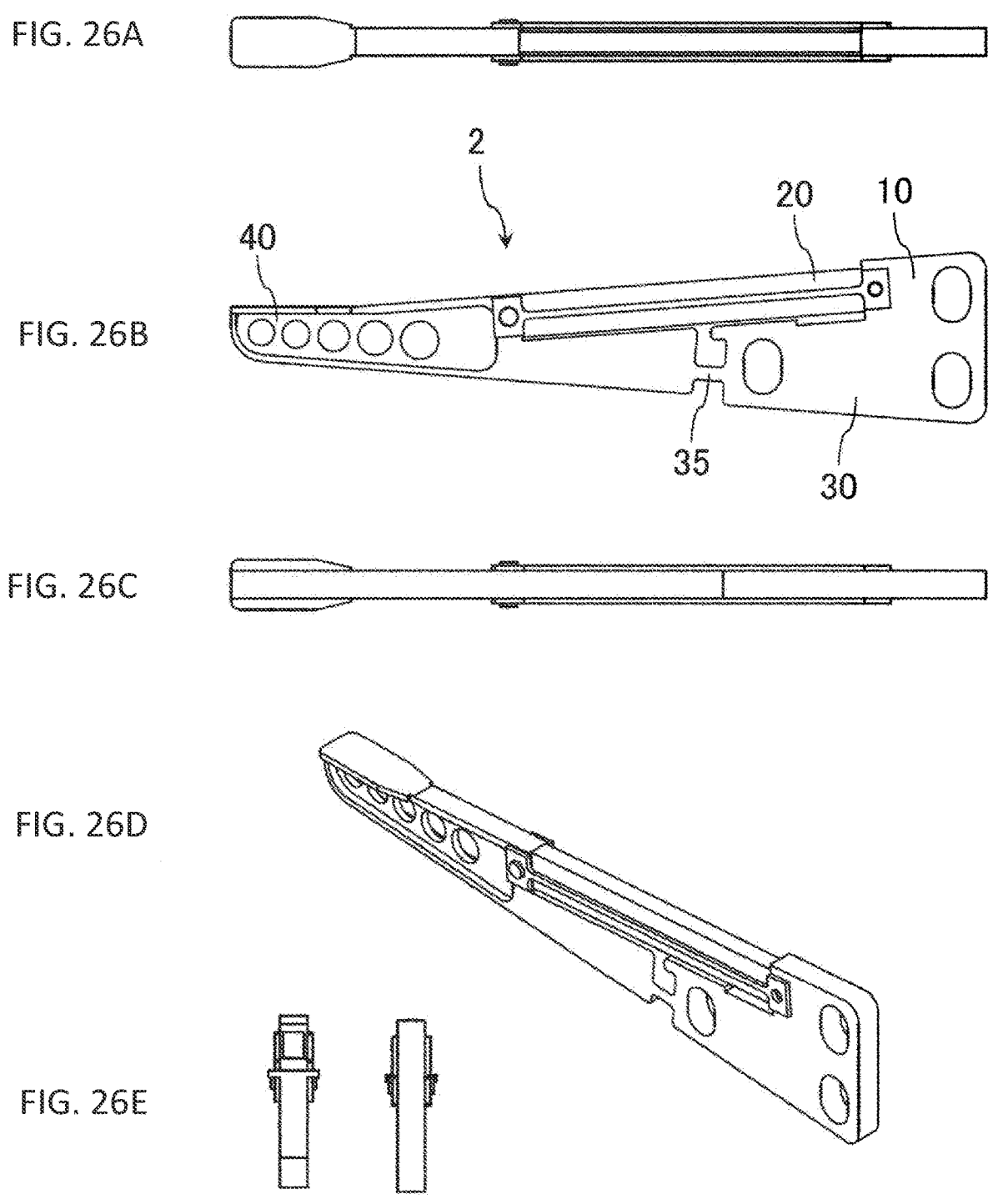

FIGS. 24A and 24B illustrate a front view and a perspective view of an example of a displacement magnifying mechanism according to another modification.

FIGS. 25A-25E illustrate views relating to a hexahedron structure and a perspective view of an example of a displacement magnifying mechanism according to another modification.

FIGS. 26A-26E illustrate views relating to a hexahedron structure and a perspective view of an example of a displacement magnifying mechanism according to another modification.

Figure 27:
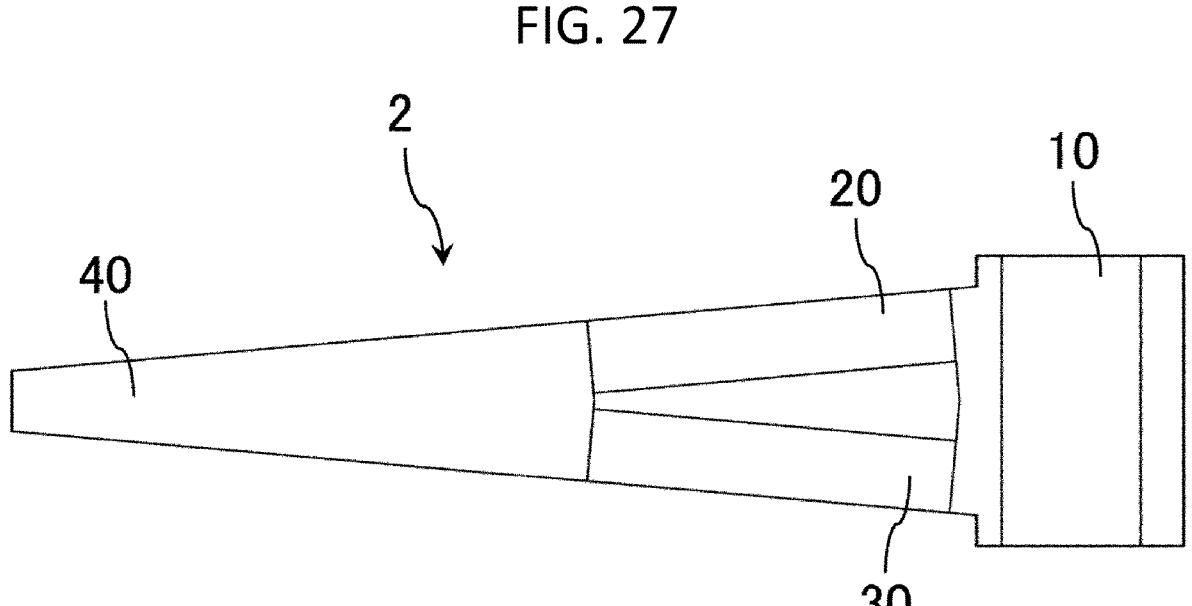

FIG. 27 is a front view illustrating an example of a displacement magnifying mechanism according to modification in which a connecting member is not provided.

6

DETAILED DESCRIPTION OF THE INVENTION

[Displacement Magnifying Mechanism 1]

First, a displacement magnifying mechanism according to an embodiment of the present invention will be described.

Figure 1:
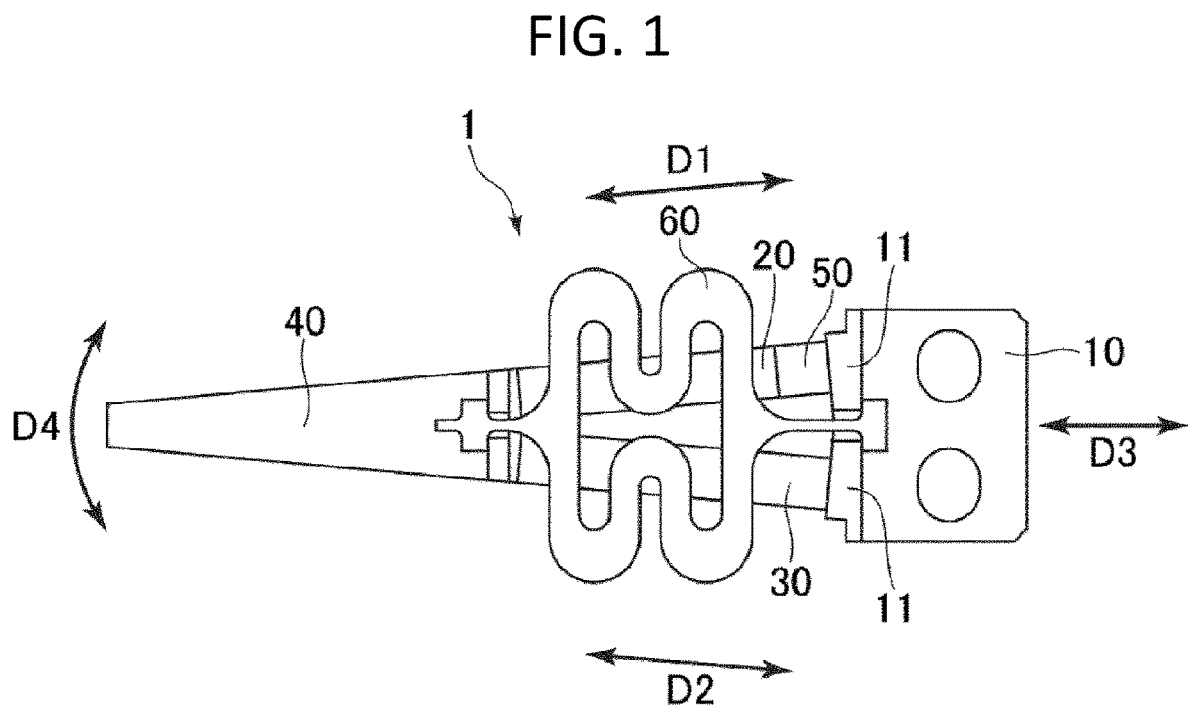

FIG. 1 is a front view of a displacement magnifying mechanism 1 according to an embodiment of the present invention.

As illustrated in FIG. 1, the displacement magnifying mechanism 1 is a mechanism using a piezoelectric element 20 which is configured to expand/contract in response to an applied voltage. The displacement magnifying mechanism 1 is configured to magnify a displacement of the piezoelectric element 20 for acting on a target object.

The displacement magnifying mechanism 1 includes a base portion 10, a piezoelectric element 20, a support member 30, an operating portion 40, a connecting member 50, and a compression member 60.

The base portion 10 is a portion which is configured to be adapted for serving as a base of the displacement magnifying mechanism 1. For example, in a case that the displacement magnifying mechanism 1 is employed in various devices (to be described later), the base portion 10 is attached to the devices.

On the base portion 10, attachment portions 11 are formed as a pair to be located side by side for attaching the piezoelectric element 20 and the support member 30. The base portion 10 may have any shape and material as long as the attachment portions 11 are provided on the base portion 10 and as long as the base portion 10 is installed in various devices in which the displacement magnifying mechanism 1 is employed.

For example, the base portion 10 may have a rectangular shape as illustrated in FIG. 1. In addition, as the material, for example, the base portion 10 may be made of metal such as stainless steel having a constant rigidity.

The piezoelectric element 20 has an end portion and the end portion thereof is attached to a mounting surface of the base portion 10. The piezoelectric element 20 is formed in an elongated shape extending along a first longitudinal direction D1. The mounting surface of the base portion 10 is formed in the attachment portion 11.

The piezoelectric element 20 is a member which is configured to generate an expansion/contraction in response to an applied voltage. As illustrated in FIG. 1, the piezoelectric element 20 is attached to one side of the attachment portion 11 via a connecting member 50 (to be described later). For example, the piezoelectric element 20 may be formed in a rectangular shape as illustrated in FIG. 1. As a main material constituting the piezoelectric element 20, it is possible to use a piezoelectric body which is made of a substance having a piezoelectric effect such as PZT (lead zirconate titanate).

The piezoelectric element 20 may have a laminated structure in which thin electrodes and thin piezoelectric bodies are alternately stacked. With such a laminated structure, it is possible to realize a large displacement even at a low voltage. Please note that, in the example, the piezoelectric element 20 is illustrated to be formed in a rectangular shape, but the shape is not particularly limited to the rectangular shape. The piezoelectric element 20 may have any shape as long as its displacement is efficiently applied to the operating portion 40 according to the piezoelectric effect.

The support member 30 has an end portion and the end portion thereof is attached to the mounting surface side by side with the piezoelectric element 20. The support member 30 is formed in an elongated shape extending in a second longitudinal direction D2 which intersects with the first longitudinal direction D1 in a plan view.

A rigidity of the piezoelectric element 20 along the first longitudinal direction D1 is equal to or less than a rigidity of the support member 30 along the second longitudinal direction D2. That is, in a case that the support member 30 is pulled along the second longitudinal direction D2 and the piezoelectric element 20 is pulled along the first longitudinal direction D1, the support member 30 will be rather hard to deform in comparison to the piezoelectric element 20 or each of the piezoelectric element 20 and the support member 30 will deform at the same amount.

In a case that the piezoelectric element 20 generate an expansion/contraction, the support member 30 is deformed accordingly. Then, a tip of the operating portion 40 is allowed to be displaced along a displacement direction D4. At this time, the piezoelectric element 20 and the support member 30 are also deformed along the displacement direction D4.

Here, a rigidity of the support member 30 along the displacement direction D4 is equal to or less than a rigidity of the piezoelectric element 20 along the displacement direction D4. In addition, in a cross section of the support member 30 as viewed from the second longitudinal direction D2, a cross-sectional secondary moment about a central axis M which is perpendicular to the displacement direction D4 and passes through a center of the support member 30 along the displacement direction D4 may differ depending on a position along the second longitudinal direction D2. This point will be described later in detail with reference to FIGS. 5A and 5B.

Figure 4:
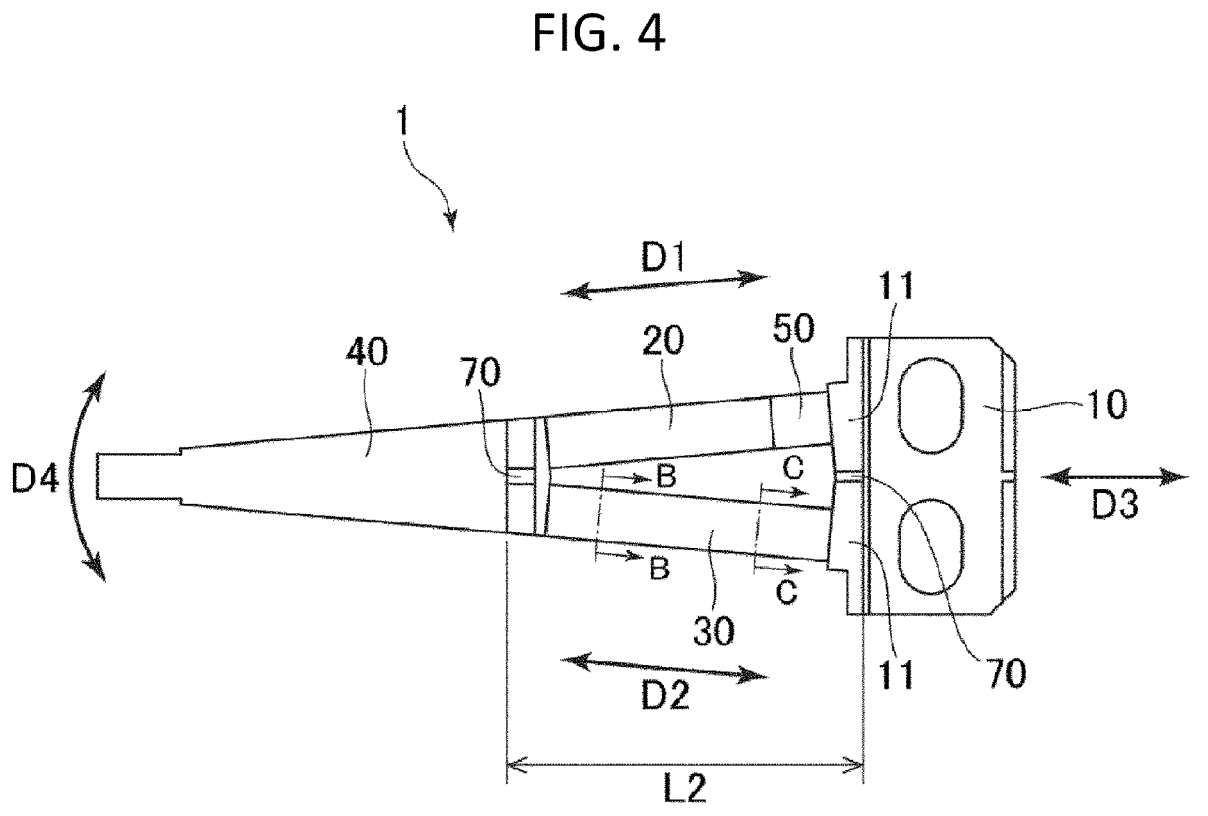
Figure 5A:
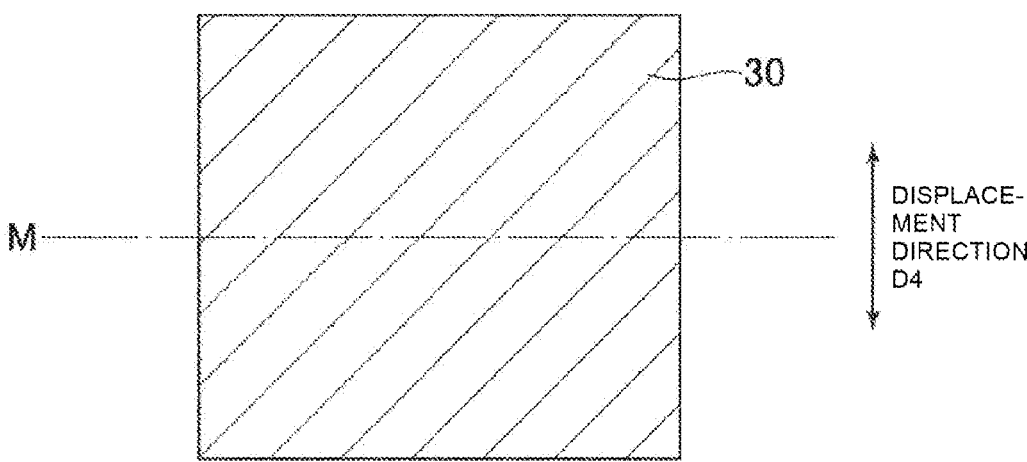
FIGS. 5A and 5B illustrate examples of cross-sectional views which are taken along (a) a line B-B and (b) a line C-C in FIG. 4.
Figure 5B:
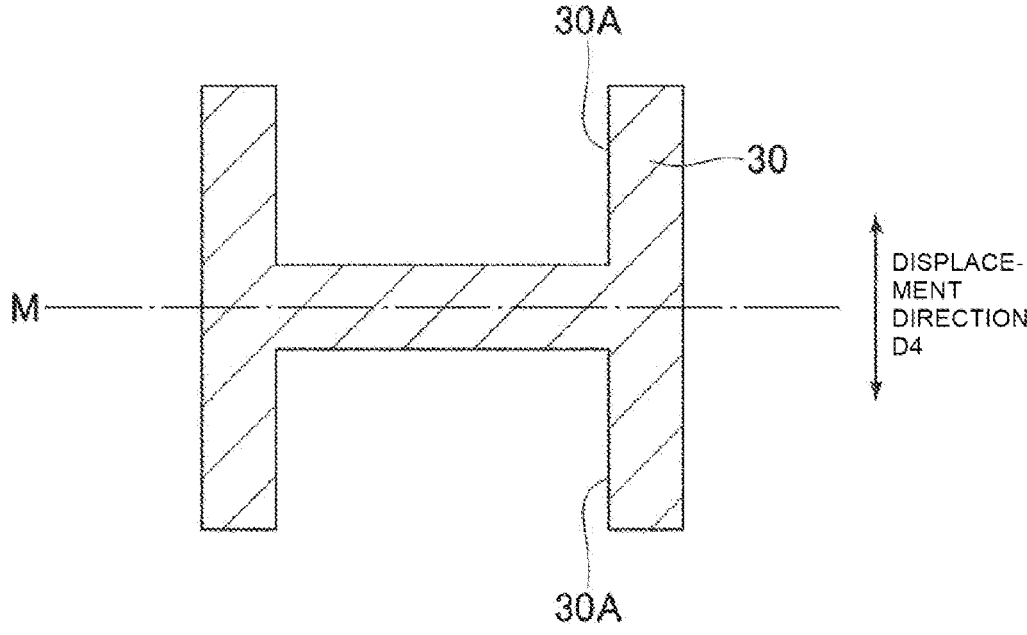

FIG. 5A is a sectional view along a B-B arrow line in FIG. 4, and FIG. 5B is a sectional view along a C-C arrow line in FIG. 4.

As illustrated in FIGS. 4 and 5A and 5B, cross-sectional shapes of the support member 30 differ depending on positions along the second longitudinal direction D2. When comparing the cross-sectional secondary moments around the central axis M between each of the cross-sectional shapes, the cross-sectional secondary moment of the cross-sectional shape of FIG. 5A is bigger than that of the cross-sectional shape of FIG. 5B.

This is because, in a case of the cross-sectional shape illustrated in FIG. 5B, a cut-out portion 30A is formed as locally cut out so that the cross-sectional secondary moment around the central axis M is reduced. In this way, in regard to the support member 30, it is possible to ensure a degree of freedom of the cross-sectional shape as compared with the piezoelectric element 20.

As illustrated in FIG. 1, the operating portion 40 is attached to each of the other end portions of the piezoelectric element 20 and the support member 30. The operating portion 40 is allowed to be displaced in response to an expansion/contraction of the piezoelectric element. The operating portion 40 is displaced along the displacement direction D4 which differs from both the first longitudinal direction D1 and the second longitudinal direction D2. When the piezoelectric element 20 generates an expansion/contraction, the support member 30 is deformed accordingly. Then, the tip of the operating portion 40 is displaced along the displacement direction D4.

The connecting member 50 is configured to connect the end portion of the piezoelectric element 20 and the attachment portion 11 of the base portion 10. The connecting member 50 is formed of a material having a higher thermal expansion coefficient than that of the support member 30.

It is possible to form the connecting member 50 integrally with the attachment portion 11 of the base portion 10.

Also, it is possible not to provide the connecting member 50. In this case, the end portion of the piezoelectric element 20 is directly connected to the attachment portion 11.

The connecting member 50 may be disposed on the other end portion of the piezoelectric element 20 instead of the above-mentioned end portion of the piezoelectric element 20. That is, the connecting member 50 may connect the other end portion of the piezoelectric element 20 and the operating portion 40. In this case, it is possible to form the connecting member 50 integrally with the operating portion 40.

As illustrated in FIG. 1, the compression member 60 is configured to connect the base portion 10 and the operating portion 40 so as to compress the piezoelectric element 20 along the first longitudinal direction D1.

Figure 2:
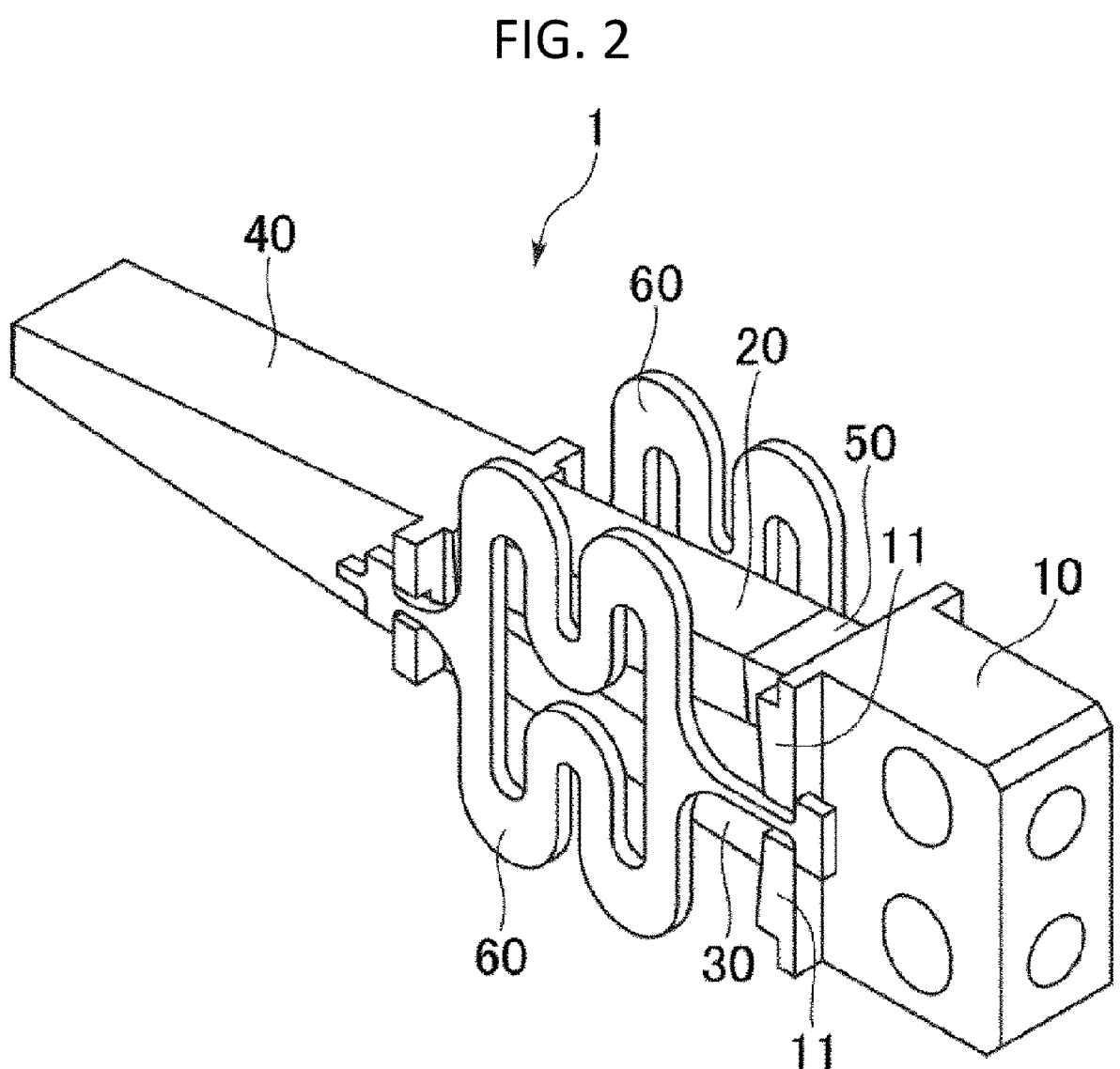
FIG. 2 is a perspective view illustrating an example of the displacement magnifying mechanism.

As illustrated in FIG. 2, two compression members 60 are provided. The two compression members 60 are respectively disposed at positions sandwiching the piezoelectric element 20 and the support member 30 therebetween.

Figure 3:
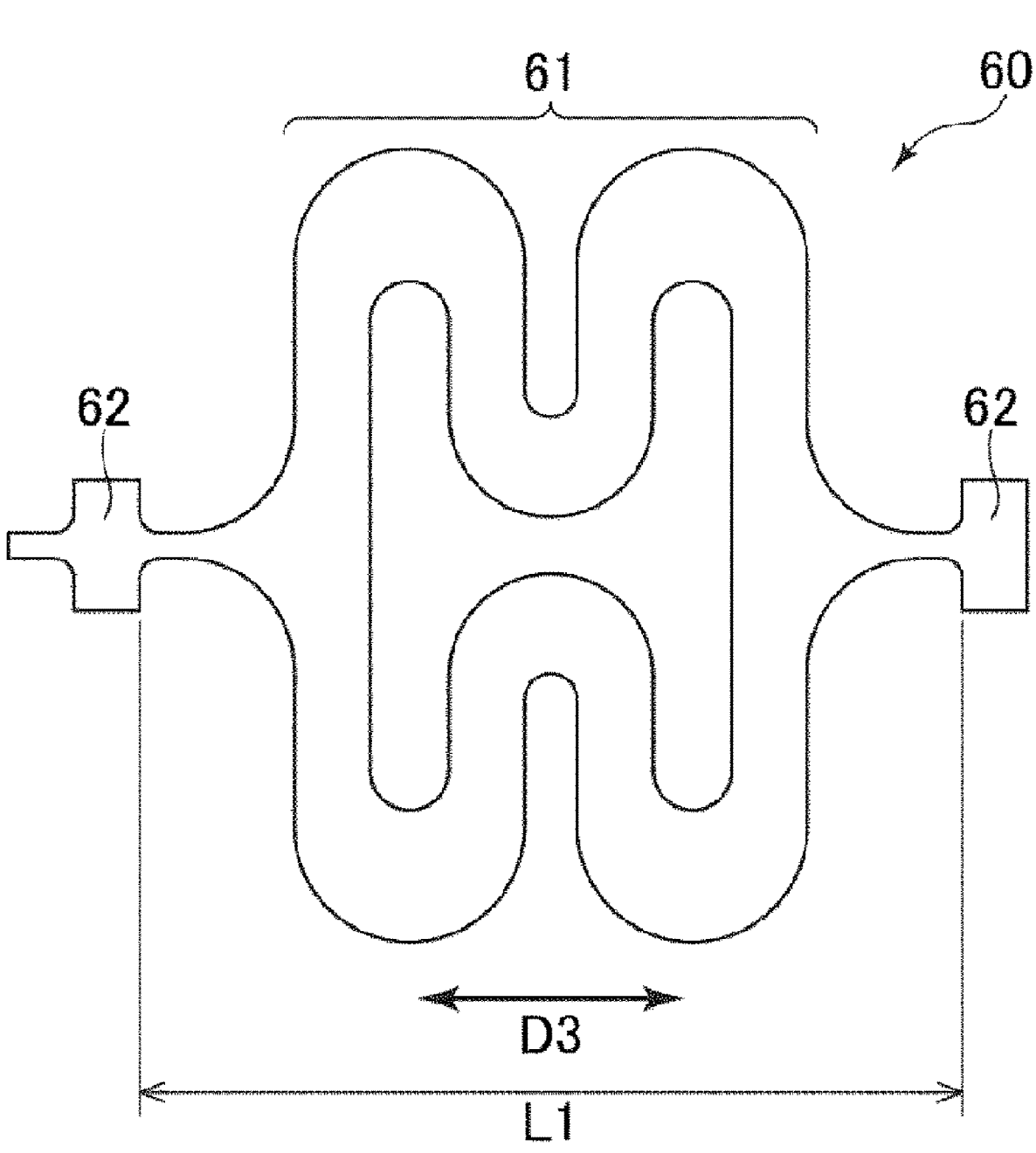
FIG. 3 is a front view illustrating an example of a compression member which is provided in the displacement magnifying mechanism.

As illustrated in FIG. 3, the compression member 60 extends along a third longitudinal direction D3 which intersects with each of the first longitudinal direction D1 and the second longitudinal direction D2 in a plan view. The compression member 60 is formed to be provided with an expansible member 61 which is able to expand/contract along the third longitudinal direction D3.

As illustrated in FIG. 3, the expansible member 61 is formed to extend along the third longitudinal direction D3 and to be repeatedly curved in a shape of bellows in a plan view. In the illustrated example, the expansible member 61 is shaped to be curved at three locations along the third longitudinal direction. However, the shape of the expansible member 61 is not limited to the illustrated example, and it is possible to change the shape arbitrarily.

The expansible member 61 is formed in a middle portion of the compression member 60 along the third longitudinal direction D3.

Fixing portions 62 are formed at both end portions of the compression member 60 along the third longitudinal direction D3. A width dimension of each of the fixing portions 62 is largely shaped along a direction perpendicular to the third longitudinal direction D3.

As illustrated in FIG. 4, fixing slits 70 are formed at each of the operating portion 40 and the base portion 10. As illustrated in FIG. 1, the compression member 60 is configured to be mounted in the fixing slits 70. At that moment, the compression member 60 is pulled and attached in a slightly extended condition. The detailed explanation will be described later.

The dimension L1 (see FIG. 3) along the third longitudinal direction D3, as measured between the two fixing portions 62 is made shorter than the dimension L2 (see FIG. 4) along the third longitudinal direction D3, as measured between the fixing slits 70 which are formed on each of the operating portion 40 and the base portion 10.

Therefore, in order to mount the compression member 60 in the fixing slits 70 of the operating portion 40 and the base portion 10, the compression member 60 is pulled along the third longitudinal direction D3 so as to be mounted in a slightly extended condition. At that moment, the compression member 60 is in an elastically deformed condition. Then, a compressive force may be exerted from the compression member 60 to each of the operating portion 40 and the base portion 10 once the compression member 60 is mounted in the fixing slits 70 and the compression member 60 is restored from the deformation along the third longitudinal direction D3,

[First Modified Example of Displacement Magnifying Mechanism 1]

Next, a displacement magnifying mechanism 2 according to a first modified example will be described with reference to FIGS. 6 to 9. FIG. 6 is a front view of a displacement magnifying mechanism 2 according to a first modified example. FIG. 7 is a perspective view of the displacement magnifying mechanism 2 according to the first modified example. FIG. 8 is a front view of a compressing member 60B which is provided in the displacement magnifying mechanism 2 according to the first modified example. And FIG. 9 is a side view of the displacement magnifying mechanism 2 according to the first modified example prior to mounting the compressing member 60B.

In the displacement magnifying mechanism 2 according to the first modified example, a position to which the compression member 60B is provided is different from that of the displacement magnifying mechanism according to the first embodiment. In this example, one of the two compressing members 60B extends along the first longitudinal direction D1 along the piezoelectric element 20, and the other of the two compressing members 60B extends along the second longitudinal direction D2 along the support member 30. In addition, the compression member 60B extending along the first longitudinal direction D1 is formed to be provided with an expansible member 61B which is able to expand/contract along the third longitudinal direction D1.

At both end portions of the compression member 60 along the first longitudinal direction D1, fixing portions 62B are formed. A width dimension of each of the fixing portions 62B is largely shaped along a direction perpendicular to the first longitudinal direction D1.

The dimension L3 (see FIG. 8) along the third longitudinal direction D3, as measured between the two fixing portions 62B is made shorter than the dimension L4 (see FIG. 9) along the third longitudinal direction D3, as measured between the fixing slits 70 which are formed on each of the operating portion 40 and the base portion 10.

Therefore, in order to mount the compression member 60B in the fixing slits 70 of the operating portion 40 and the base portion 10, the compression member 60B is pulled along the first longitudinal direction D1 so as to be mounted in a slightly extended condition. At that moment, the compression member 60 is in an elastically deformed condition. Then, a compressive force may be exerted from the compression member 60B to the piezoelectric element 20 via the operating portion 40 and the base portion 10 once the compression member 60B is mounted in the fixing slits 70 and the compression member 60 is restored from the deformation along the third longitudinal direction D3.

[Second Modified Example of Displacement Magnifying Mechanism 1]

Next, a displacement magnifying mechanism 3 according to a second modified example will be described with reference to FIGS. 10 and 11. FIG. 10 is a front view of a displacement magnifying mechanism 3 according to a second modified example, and FIG. 11 is a front view of the compression member 60 provided in the displacement magnifying mechanism 3 according to the second modified example.

In the displacement magnifying mechanism 3 according to the second modified example, a shape of the compression member 60 is different from that of the displacement magnifying mechanism according to the first embodiment. That is, in the compression member 60 of the displacement magnifying mechanism 3 according to the second modified example, the above-mentioned expansible member 61 is not formed and the compression member 60 extends straight along the third longitudinal direction D3 as a whole.

The dimension L5 (see FIG. 11) along the third longitudinal direction D3, as measured between the two fixing portions 62 is made shorter than the dimension L2 (see FIG. 10) along the third longitudinal direction D3, as measured between the fixing slits 70 which are formed on each of the operating portion 40 and the base portion 10.

Therefore, in order to mount the compression member 60 in the fixing slits 70 of the operating portion 40 and the base portion 10, the compression member 60 is pulled along the first longitudinal direction D1 so as to be mounted in a slightly extended condition. At that moment, the compression member 60 is in an elastically deformed condition. Then, a compressive force may be exerted from the compression member 60 to each of the operating portion 40 and the base portion 10 once the compression member 60 is mounted in the fixing slits 70 and the compression member 60 is restored from the deformation along the third longitudinal direction D3, In addition, as another modified example, it is possible to provide a hinge member at least at one of the end portion of the piezoelectric element 20 along the first longitudinal direction D1 and the end portion of the support member 30 along the second longitudinal direction D2 so as to promote a deformation of the piezoelectric element 20 and the support member 30 along the displacement direction D4.

Such a hinge member may be provided at least at one of the other end portion of the piezoelectric element 20 along the first longitudinal direction D1 and the other end portion of the support member 30 along the second longitudinal direction D2.

FIG. 23 is a front view of another modified example of the displacement magnifying mechanism.

In regard to the displacement magnifying mechanism 2, it is required to convert an energy for deforming the PZT to generate an expansion/contraction into an energy for displacing the operating portion 40 along the displacement direction D4 with a waste as little as possible. However, in order to convert the expansion/contraction deformation of the PZT into the displacement (up/down movement) of the operating portion 40 along the displacement direction D4, a deformation such as bending up and down will be required for the PZT and the support member 30.

An energy will be required for causing a bending deformation. But there is much waste in the energy for causing the bending deformation. By making a narrow portion (hinge portion 35) in the central part of the support member 30, it becomes possible to reduce the energy associated with the bending deformation. Thus, it becomes possible to increase a vertical kinetic energy of the operating portion by that amount and it becomes easy to cause the bending deformation.

On the other hand, in a case that the width of the hinge portion 35 is too narrow, the rigidity of the support member 30 is reduced and a force for causing the up/down movement of the operating portion 40 is reduced. According to this, the vertical kinetic energy of the operating portion 40 that can be taken out as output will also be reduced. Therefore, there is an appropriate range for the width and length of the hinge. As an example, it is preferable that the width of the hinge portion 35 is about 30% or less of the thickness of the support member 30, and the length of the hinge is about 5% or more of the length of the support member 30. With this configuration, an amplitude of the up/down movement of the operating portion 40 will be improved by about 10% or more, and an energy of the up/down movement of the operating portion 40 that can be taken out will be improved by about 5% or more, as compared with the configuration without the hinge portion 35.

FIGS. 24A and 24B illustrate a front view and a perspective view of another modified example of the displacement magnifying mechanism.

By bringing the hinge portion 35 close to the operating portion 40 and by adding a mounting screw to the hinge portion 35, it becomes possible to increase a resonance frequency of actuator. The resonance frequency may be increased more than 10% as compared with the case of FIG. 23.

FIGS. 25A-25E illustrate views relating to a hexahedron structure (a front view, a side view, etc.) and a perspective view of another modified example of the displacement magnifying mechanism.

According to the configuration of FIGS. 25A-25E, the support member 30 is integrally formed with the base portion 10 and the thickness t thereof is made thinner than that of the base portion 10 of FIGS. 24A-24B (for example, t is 1.6 mm). Thus, it become possible to make the displacement magnifying mechanism 2 more compact. By integrally forming the support member 30 with the base portion 10, it becomes possible to adopt a pressing method or the like to them. Then, it become possible not only to reduce the number of parts, but also to suppress the production cost, as a merit. Furthermore, by integrally forming as above, a fastening rigidity between the support member 30 and the base portion 10 will correspond to a strength of the material itself. Thus, a force generated in the piezoelectric element 20 will be transmitted to the operating portion 40 more. As a result, the resonance frequency will be increased and the kinetic energy which can be taken out from the operating portion 40 will also be increased, as a merit.

FIGS. 26A-26E illustrate views relating to a hexahedron structure (a front view, a side view, etc.) and a perspective view of another modified example of the displacement magnifying mechanism.

According to the configuration of FIGS. 26A-26E, by reducing the number of parts, it becomes possible to minimize the number of fastening points between the members and also to increase a rigidity of the structure. As a result, it becomes possible to maximize a generated force that can be taken out from the operating portion 40.

As described above, according to the displacement magnifying mechanisms 1 to 3 of the present embodiment, the piezoelectric element 20 and the support member 30 are attached to the base portion 10, and the operating portion 40 is attached to them. Therefore, by allowing the piezoelectric element 20 to be displaced along the first longitudinal direction D1, the operating portion 40 will be allowed to be displaced along the displacement direction D4. Thus, by configuring the displacement magnifying mechanisms 1 to 3 with only one piezoelectric element 20, it becomes possible to control its driving system more easily as compared with the case where two piezoelectric elements 20 are used in a displacement magnifying mechanism.

Furthermore, in the displacement magnifying mechanisms 1 to 3, the compression member 60 is provided so as to exert a preload to the piezoelectric element 20 along the compression direction. Therefore, in regards to the piezoelectric element 20 which is liable to be damaged due to a load exerted along a tensile direction, it becomes possible to relieve the load exerted along the tensile direction on the piezoelectric element.

In addition, a rigidity of the piezoelectric element 20 along the first longitudinal direction D1 is equal to or less than a rigidity of the support member 30 along the second longitudinal direction D2. Therefore, in regards to an energy at a time of expansion/contraction of the piezoelectric element 20 along the first longitudinal direction D1, it becomes possible to suppress a loss of the energy due to a deformation of the support member 30. Thus, it becomes possible to increase an energy efficiency of the displacement magnifying mechanisms 1 to 3.

Furthermore, the connecting member 50 is provided for connecting the end portion of the piezoelectric element 20 and the base portion 10. The connecting member 50 is formed of a material having a higher thermal expansion coefficient than that of the support member 30. Therefore, in a case that the support member 30 is subjected to a thermal expansion at a larger degree than the piezoelectric element 20, the connecting member 50 is subjected to a thermal expansion at a larger degree than the support member 30. As a result, in regards to the structure connecting the base portion 10 and the operating portion 40, it becomes possible to suppress a remarkable difference between a total sum of an amount of thermal expansion of the piezoelectric element 20 and the connecting member 50 located on one side, and an amount of thermal expansion of the support member 30 located on the other side. Thus, it becomes possible to suppress a remarkable change of an initial position of the operating portion 40 along the displacement direction D4 under the influence of heat.

Furthermore, in a case that the connecting member 50 is formed integrally with the base portion 10, it becomes possible to reduce the number of parts.

FIG. 27 is a front view of a modified example of the displacement magnifying mechanism without the connecting member 50. According to the configuration of FIG. 27, the operating portion 40 and the base portion 10 are connected by the piezoelectric element 20 without using the connecting member 50. Therefore, it becomes possible to reduce the number of parts and also to decrease the production cost.

In addition, in a case that the connecting member 50 is provided in a position connecting the other end portion of the piezoelectric element 20 and the operating portion 40, it is possible to suppress a remarkable difference between an amount of thermal expansion on the side of the piezoelectric element 20 and an amount of thermal expansion on the side of the support member 30, as described above.

Furthermore, a rigidity of the support member 30 along the displacement direction D4 is equal to or less than a rigidity of the piezoelectric element 20 along the displacement direction D4. Therefore, at a time when the operating portion 40 is displaced along the displacement direction D4 along with an expansion/contraction of the piezoelectric element 20, it is possible to prevent the support member 30 from limiting the displacement of the operating portion 40 along the displacement direction D4.

Furthermore, in a cross section of the support member 30 as viewed from the second longitudinal direction D2, a cross-sectional secondary moment about a central axis M which is perpendicular to the displacement direction D4 and passes through a center of the support member 30 along the displacement direction D4 will differ depending on a position along the second longitudinal direction D2. That is, for example, unlike the piezoelectric element 20 which is formed by a laminated structure, it is possible to secure a degree of freedom for the shape of the support member 30. Therefore, it is easy to provide a local deformable portion in the support member 30. Thus, it becomes possible to adjust displacement characteristics of the displacement magnifying mechanism 1 to 3 entirely by using the shape of the support member 30.

Furthermore, in a case that a hinge member is provided at each of the end portion of the piezoelectric element 20 along the first longitudinal direction D1 and the end portion of the support member 30 along the second longitudinal direction D2 for promoting a deformation of the piezoelectric element 20 and the support member 30 along the displacement direction D4, it becomes easy to deform the piezoelectric element 20 and the support member 30 along the displacement direction D4 by using the hinge member.

In regard to the hinge member, in a case that the hinge member is provided at each of the other end portion of the piezoelectric element 20 along the first longitudinal direction D1 and the other end portion of the support member 30 along the second longitudinal direction D2, it is possible to achieve the same effect as described above.

In addition, two compression members 60 are respectively disposed at positions sandwiching the piezoelectric element 20 and the support member 30 therebetween. Therefore, it becomes possible to exert a compressive force uniformly to the piezoelectric element 20 and the support member 30 compared to the configuration in which the piezoelectric element 20 and the support member 30 are compressed by using one compression member 60.

Furthermore, in a case that the compression member 60 is formed to be provided with an expansible member 61 which is able to expand/contract, it becomes easy to extend the compression member 60 along the third longitudinal direction D3 at a time when the compression member 60 is mounted to the base portion 10 and the operating portion 40. Because of that, an assemblability of the compression member 60 may be ensured.

[Actuator]

Next, an example of which the displacement magnifying mechanism 1 of the present invention is used as an actuator will be described.

FIG. 12 is a front view of an example of an actuator 1000 which uses the displacement magnifying mechanism 2 according to the first modified example. The actuator 1000 is configured as a controlled machine which is driven by electric signals for performing predetermined motions.

The actuator 1000 includes the displacement magnifying mechanism 2 and a drive portion 80. The drive portion 80 is configured to supply a voltage or a current to the piezoelectric element 20 and the support member 30 to drive the piezoelectric element 20 so as to generate an expansion/contraction thereof.

[Example in which Actuator is Used to Drive Working Element Used for Processing Electronic Component]

FIG. 13 is a front view of an example in which the actuator of FIG. 12 is used to drive a working element which is configured to process an electronic component. A measuring probe 1101 is attached to a distal end of the operating portion 40 of the actuator 1000, as an object. The measuring probe 1101 is configured as a working element. The working element is used, for example, to contact with a chip-shaped electronic component in order to evaluate a characteristic of the electronic component.

The drive portion 80 is configured to supply a voltage or a current to the piezoelectric element 20 so as to displace the piezoelectric element 20 by a predetermined amount.

Accordingly, an enlarged displacement is transmitted to the measuring probe 1101. As a result, it becomes possible to displace the measuring probe 1101 along the displacement direction D4. In addition, the drive portion 80 is configured to stop supplying a voltage or a current to the piezoelectric element 20. Consequently, it becomes possible to return the measuring probe 1101 to its original position.

FIG. 14 is a figure to illustrate a measuring condition in which an electrical characteristic of the electronic component is measured by using the measuring probe 1101.

As illustrated in FIG. 14, a turntable 1090 of the measuring device is used with the measuring probe 1101. The turntable 1090 is rotatably provided and includes a plurality of storage grooves 1091 for receiving electronic component(s) 1080 therein along a circumferential direction. By repeatedly displacing (moving up and down) the measuring probe 1101 as a working element at a high speed by using the drive portion 80 while rotating the turntable 1090, electrical characteristics or the like of the electronic components 1080 received in a plurality of the storage grooves 1091 are sequentially measured.

That is, at a time when an electronic component 1080 received in the storage groove 1091 reaches a measurement position directly above the measuring probe 1101 by rotating the turntable 1090, the measuring probe 1101 is displaced upward.

Accordingly, a tip of the measuring probe 1101 is brought into contact with an electrode 1081 which is provided on a lower surface of the electronic component 1080. As a result, an electrical characteristic of the electronic component 1080 is measured. After the measurement, the measuring probe 1101 is displaced downward to retract. Then, at a time when a next electronic component 1080 reaches the measurement position, the same operation is performed again. These operations are repeated at a high speed.

In this way, by using the actuator 1000 for measuring the electronic components, the measuring probe which is adapted for serving as a working element may be driven at a high speed and with a practical stroke. In addition, it is possible to reduce a breakage due to a tension of the piezoelectric element 20 and/or an influence of thermal expansion and creep.

The aforementioned explanation is given to illustrate an example of using the measuring probe 1101 of the measuring device as a working element. Please note that the working element is not limited to the measuring probe.

FIG. 15 is a figure to illustrate a condition in which the actuator 1000 is used in the electronic component processing apparatus. In this example, the actuator 1000 is provided with a suction nozzle 1102 as a working element. That is, the working element to be driven is configured as a suction nozzle for sucking the electronic component.

The structure illustrated in FIG. 15 is the same as the structure illustrated in FIG. 13 except that the working element attached to the operating portion 40 of the actuator 1000 is changed to the suction nozzle 1102.

The suction nozzle 1102 is attached to the operating portion 40 so as to extend along the vertical direction. The suction nozzle 1102 is connected to a suction mechanism (not shown). By sucking with a suction mechanism such as a vacuum pump or the like provided in the suction mechanism, the electronic component is suctioned to a suction port 1104 of the lower end of the suction nozzle 1102.

The actuator 1000 may be used in a measuring device for measuring electronic components. An example of such a measuring device is illustrated in FIG. 16. The measuring device includes the actuator 1000 (see FIG. 15), a suction nozzle 1102, a suction mechanism, a turntable 1110, a base 1120, and a measuring jig 1130.

The turntable 1110 is rotatably provided and has a plurality of storage grooves 1111 for receiving electronic component(s) 1080 therein along the circumferential direction. The storage grooves 1111 are provided so as to penetrate the turntable 1110.

The electronic component 1080 is received in the storage groove 1111 by arranging the electrode 1081 at a lower surface side. The base 1120 rotatably supports the turntable 1110, and the surface thereof serves as a conveying surface for the electronic component 1080. In addition, a through hole 1121 is formed in the base 1120, and the suction nozzle 1102 is provided as a working element at an upper position of the through hole 1121. Further, the measurement jig 1130 is provided at a lower position of the through hole 1121. The measurement jig 1130 is attached to a frame 1140, and a measurement terminal 1131 is provided on an upper surface of the measurement jig 1130 at a position corresponding to the electrode 1081 of the electronic component 1080.

By repeatedly displacing (moving up and down) the suction nozzle 100 which is adapted to serve as a working element at a high speed via the operating portion 40 by applying a voltage or a current at a predetermined amount while rotating the turntable 1110, the electronic components 1080 received in a plurality of storage grooves 1111 are sequentially suctioned and the electrical characteristics or the like of the electronic components 1080 are measured.

That is, by rotating the turntable 1110, the electronic components 1080 received in the storage groove 1111 are transported along the conveying surface of the base 1120. At a time when an electronic component 1080 reaches a position corresponding to the through hole 1121, the electronic component 1080 is suctioned to the suction nozzle 1102.

Then, the suction nozzle 1102 is displaced downward in this condition and the electrode 1081 of the electronic component 1080 is brought into contact with the measurement terminal 1131 of the measurement jig 1130. As a result, an electrical characteristic of the electronic component 1080 is measured.

After the measurement, the suction nozzle 1102 is displaced upward in order to return the electronic component 1080 suctioned to the suction nozzle 1102 onto the conveying surface and to release the suction. Then, at a time when a next electronic component 1080 reaches the position corresponding to the through hole 1121, the same operation is performed again. These operations are repeated at a high speed.

In this example, only the working element is changed from the measuring probe 1101 to the suction nozzle 1102. Therefore, it is possible to obtain the same effect as in the case of using the measuring probe 1101.

In addition, it is possible to use the actuator 1000 equipped with the suction nozzle 1102 in an installing device which is configured to install an electronic component into a carrier tape. An example of such an installing device is illustrated in FIG. 17. The installing device includes the actuator 1000 (see FIG. 15), a suction nozzle 1102, a suction mechanism, a turntable 1150, a base 1160, and a magnet 1180.

As illustrated in FIG. 17, the turntable 1150 is rotatably provided and includes a plurality of storage grooves 1151 for receiving the electronic component(s) 1080 therein along the circumferential direction. The storage grooves 1151 are provided so as to penetrate the turntable 1150.

The base 1160 rotatably supports the turntable 1150, and the surface serves as a conveying surface for the electronic components 1080.

In addition, a carrier tape 1170 is movably disposed below the base 1160. A plurality of cavities 1171 are provided in the carrier tape 1170 at equal intervals to receive the electronic component(s) 1080 therein.

A through hole 1161 is formed in the base 1160, and the suction nozzle 1102 which is adapted to serve as a working element is provided at an upper position of the through hole 1161. In addition, a magnet 1180 is provided at a position corresponding to the through hole 1161 below the carrier tape 1170.

A voltage or a current is supplied to the piezoelectric element 20 in order to repeatedly move (move up and down) the suction nozzle 1102 which is adapted to serve as a working element at a high speed while rotating the turntable 1150 and moving the carrier tape 1170.

Accordingly, the electronic components 1080 received in a plurality of storage grooves 1151 are sequentially installed in the cavity 1171 of the carrier tape 1170. That is, the turntable 1150 is rotated.

Then, the electronic components 1080 received in the storage groove 1151 are transferred along the conveying surface of the base 1160. At a time when an electronic component 1080 reaches a position corresponding to the through hole 1161, the electronic component 1080 is suctioned to the suction nozzle 1102, and the cavity 1171 is placed at a position corresponding to the through hole 1161.

Then, the suction nozzle 1102 is displaced downward in this condition and the suction of the suction nozzle 1102 is released in order to install the electronic component 1080 into the cavity 1171. After the installation, the suction nozzle 1102 is displaced upward and returned to the position illustrated in FIG. 17 passing through the through hole 1161 and the storage groove 1151.

Then, at a time when a next electronic component 1080 reaches the position corresponding to the through hole 1161, the same operation is performed again. These operations are repeated at a high speed. In this example, the magnet 1180 is provided in order to stabilize a posture of the electronic component 1080 by exerting an electromagnetic attraction force to the electronic component 1080 which is received in the cavity 1171.

Consequently, even in a case when the suction nozzle 1102 is used in the installing device, it is possible to obtain the same effect as in the case of using the measuring probe 1101.

[Air Valve]

Next, an air valve using the actuator of the above-mentioned embodiment will be described. FIG. 18 is a sectional view of an air valve according to an embodiment. An air valve is configured as a device for arbitrarily sealing a gas supplied therein and discharging the gas to outside.

As illustrated in FIG. 18, the air valve 3000 includes a housing 3102 which defines an air pressure chamber 3101 for introducing a compressed air therein and also includes an air outlet 3103 through which the air pressure chamber 3101 is connected to outside. In addition, the air valve 3000 includes a valve body 3200 which is operative to open and close the air outlet 3103, and also an actuator 3300 for driving the valve body 3200.

The actuator 3300 is configured as the displacement magnifying mechanism 1 according to the first embodiment provided with a drive portion 80.

An air supply port 3104 is formed in the housing 3102 which defines the air pressure chamber 3101. A compressed air is introduced through the air supply port 3104 from a pneumatic supply source (not shown). The air supply port 3104 and the base portion 10 of the displacement magnifying mechanism 1 are respectively arranged on different planes.

The air outlet 3103 is provided at one location of the wall portion of the housing 3102 in order to remove a gas from the air pressure chamber 3101 to outside of the air valve 3000.

For example, the valve body 3200 may be formed of a rubber sheet.

In the example illustrated in FIG. 18, the air supply port 3104 is provided at a position corresponding to the piezoelectric element 20. In other words, the air supply port 3104 is provided at a position where an air supplied from the air supply port 3104 may blow easily against the piezoelectric element 20. Accordingly, it is expected that the piezoelectric element 20 may be cooled effectively by using a flow of air supplied from the air supply port 3104. Also, in a case where the air supply port 3104 and the air outlet 3103 are arranged in a straight line, it becomes possible to minimize a pressure loss which is lead from the air supply port 3104 to the air outlet 3103.

It is possible to apply a resin material such as aluminum die casting or PPS etc., to the housing 3102 and a lid (not shown) thereof. By having the same shape of the housing 3102 in a plan view and by jointing to the housing 3102, the lid seals the interior of the housing 3102.

In the case of aluminum die-casting, the housing 3102 and the lid (not shown) may be airtightly jointed by screwing. On this occasion, a sealing material is sandwiched between the housing 3102 and the lid appropriately. In the case of resin material, it is possible to apply ultrasonic welding or laser welding etc., to them.

According to the air valve 3000 which is configured as mentioned above, the drive portion 80 of the actuator 3300 is configured to supply a voltage or a current to the piezoelectric element 20 so as to generate an expansion/contraction of the piezoelectric element 20. By generating such an expansion/contraction displacement of the piezoelectric element 20, an enlarged displacement is outputted from the operating portion 40. Accordingly, the valve body 3200 is allowed to be displaced along the displacement direction D4 so as to create a gap between the valve body 3200 and the air outlet 3103. Consequently, a compressed air supplied from the air supply port 3104 passes through a space on both sides of the actuator 3300 and then a compressed air is ejected from the air outlet 3103 through the gap which is created as mentioned above.

It is possible to configure the above-mentioned constitution to be closed normally. In this case, in a condition where no voltage is applied to the piezoelectric element 20, the air outlet 3103 is closed by the valve body 3200. Then, by generating a contraction displacement of the piezoelectric element 20, the valve body 3200 is allowed to be spaced apart from the air outlet 3103. Accordingly, the air outlet 3103 is opened so that a compressed air is ejected from the air outlet 3103.

Alternatively, it is possible to configure the above-mentioned constitution to be opened normally. In this case, in a condition where no voltage is applied, the air outlet 3103 is opened. Then, in a condition where a voltage is applied to the piezoelectric element 20 in order to generate an extensional displacement of the piezoelectric element 20, the valve body 3200 is allowed to be displaced so as to close the air outlet 3103.

In this way, it is possible to generate an extensional displacement of the piezoelectric element 20 in order to prevent air leakage or the like.

[Polishing Device]

Next, a polishing device using the displacement magnifying mechanism 1 according to the first embodiment will be described. The polishing device is configured as a device which polishes a target object (for example, an object to be polished) automatically.

FIG. 19 is a front view of an example of a configuration of the polishing device 900 using the displacement magnifying mechanism 1 according to the first embodiment of the present invention. The polishing device 900 includes the displacement magnifying mechanism 1 and a polishing part 800 which is provided on a surface of the operating portion 40 opposite to the other surface in contact with the piezoelectric element 20.

The polishing device 900 is attached to the operating portion 40 of the displacement magnifying mechanism 1. The polishing portion 800 serving as a polishing tool is configured to be in contact with a target object 901 directly at its end or through free abrasive grains 902 in between.

In the case illustrated here, the polishing method includes preparing of free abrasive grains 902 mixed with a liquid in a polishing position and generating an expansion/contraction of the piezoelectric element 20 so as to slide the polishing part 800 over a surface of the target object 901 to polish the target object 901. Alternatively, it is also conceivable to directly mount diamond abrasive grains or the like to the polishing part 800 to polish, as another polishing method.

It is also conceivable to configure the polishing device 900 by attaching the target object 901 to the operating portion 40 and fixing the polishing part 800. In this case, a polishing is similarly carried out by the polishing device 900 because there is no change in the relative movement between the polishing part 800 and the target object 901.

With such a configuration of the polishing device 900, it is possible to efficiently eliminate a tensile force which is exerted to the piezoelectric element 20. Thus, it becomes possible to constitute the polishing device 900 so as to efficiently prevent a destruction or peeling, etc., at a connecting point, due to a tensile force which is exerted to the piezoelectric element 20.

[Dispenser]

Next, a dispenser using the actuator of the above-mentioned embodiment will be described. The dispenser is configured as a device which automatically switches between filling of liquid and discharging of liquid.

FIG. 20 is a front sectional view of a main part of a dispenser according to an embodiment. FIG. 21 is a cross-sectional view of a liquid discharging member of the dispenser of FIG. 20 where the liquid discharging member is closed. FIG. 22 is a cross-sectional view of the liquid discharging member of the dispenser of FIG. 20 where the liquid discharging member is opened.

As illustrated in FIG. 20, the dispenser 2000 includes the liquid discharging member 2100 for introducing a liquid therethrough and for discharging the introduced liquid. In addition, the dispenser 2000 includes a valve 2200 for switching between discharging a liquid from the liquid discharging member 2100 and shutting off the discharge of the liquid, and also an actuator 2300 for driving the valve 2200. The actuator 2300 is configured as the displacement magnifying mechanism 2 according to the first modified example provided with a drive portion 80.

As illustrated in FIG. 21, the liquid discharging member 2100 includes a main body portion 2101, a liquid chamber 2102 formed in the main body portion 2101 for inserting the valve 2200 therein, a liquid introducing part 2103 for introducing a liquid into the liquid chamber 2102, a liquid discharge port 2104 communicating with a bottom of the liquid chamber 2102, and a valve seat 2105 provided at the bottom of the liquid chamber 2102 for seating a tip of the valve 2200 thereon.

The tip of the valve 2200 has a spherical rod-shaped and the valve 2200 extends vertically. The liquid chamber 2102 has a cylindrical shape corresponding to the shape of the valve 2200. As illustrated in FIG. 21, the valve 2200 is normally seated on the valve seat 2105 at its tip so as to close the liquid outlet 2104. In this condition, a liquid is not discharged.

The valve 2200 is configured to be lifted along the displacement direction D4 by using the actuator 2300. As illustrated in FIG. 22, when the valve 2200 is lifted upward by driving the actuator 2300, the liquid discharge port 2104 is allowed to be opened. Then, a liquid is discharged through the liquid discharge port 2104.

The actuator 2300 has the same structure as the actuator 1000 illustrated in FIG. 12.

The valve 2200 is attached to the operating portion 40. The operating portion 40 is composed of a high tensile strength aluminum material for weight reduction. As illustrated in the figure, the operating portion 40 may be processed so as to form a thin portion 501 at a central portion thereof.

When a voltage is applied to the piezoelectric element 20 by using the drive portion 80, the piezoelectric element 20 is allowed to extend, and the operating portion 40 is driven upward. Accordingly, the valve 2200 is allowed to be lifted upward. Also, when the application of a voltage to the piezoelectric element 20 is stopped, the valve 2200 is allowed to be moved downward. Alternatively, it is possible to move the valve 2200 up and down by generating a contraction displacement in the piezoelectric element 20.

In this example, the base portion 10 of the actuator 2300 is supported on the base 2400. The liquid discharging member 2100 is also supported on the base 2400.

It is possible to configure the above-mentioned structure to be normally closed. For example, when the application of a voltage to the piezoelectric element 20 is stopped, the liquid discharge port 2104 is closed by the valve 2200 as illustrated in FIG. 21. And, when an expansion displacement is generated in the piezoelectric element 20, the liquid discharge port 2104 is allowed to be opened by lifting the valve 2200 upward and then a liquid is discharged through the liquid discharge port 2104 as illustrated in FIG. 22.

Alternatively, it is possible to configure the above-mentioned structure to be normally opened. For example, when a voltage is not applied, the liquid discharge port 2104 is opened by the valve 2200. In addition, when a voltage is applied to generate a contraction displacement in the piezoelectric element 20, the valve 2200 is allowed to be moved downward and then the liquid discharge port 2104 is closed.

[Other Applications]

While the embodiments of the present invention have been described above, the above-mentioned embodiments are only examples and should not be considered as restrictive. Without departing from the scope and spirit of the present invention, arbitrary part(s) of the embodiment(s) may be omitted, substituted, or modified in various ways.

For example, the displacement magnifying mechanism 100 according to an embodiment of the present invention may be used in a combined manner by connecting a plurality of displacement magnifying mechanisms in series or in parallel. In this case, it is possible to connect a plurality of displacement magnifying mechanisms in series, in other words, it is possible to connect the base portion 10 of the displacement magnifying mechanism 1 and the operating portion 40 of another displacement magnifying mechanism 1 in order to increase the displacement furthermore. In particular, in places having severe space restrictions, such a usage manner is effective. It is also conceivable to connect two displacement magnifying mechanisms 1 for obtaining a connecting angle of 90 degree in another variation of connection method.

In addition, while a case in which the piezoelectric element 20 is used as the expansion/contraction element has been described in the above embodiments, any element can be used as long as the element can generate an expansion and/or contraction appropriately. For example, it is possible to use other element(s) having an expansion/contraction function such as a magnetostrictive element, a shape-memory alloy or the like.

EXPLANATION OF REFERENCES

1 Displacement magnifying mechanism
10 Base portion
11 Attachment portion
20 Piezoelectric element
30 Support member
40 Operating portion
50 Connecting member
80 Drive portion
800 Polishing portion
900 Polishing device
1000 Actuator
2000 Dispenser
3000 Air valve

What is claimed is:

1. A displacement magnifying mechanism comprising:
a base portion adapted for serving as a base;
a piezoelectric element of which an end portion is attached to a mounting surface of the base portion, the piezoelectric element extending along a first longitudinal direction;
a support member of which an end portion is attached to the mounting surface side by side with the piezoelectric element, the support member extending along a second longitudinal direction which intersects with the first longitudinal direction;
an operating portion attached to each of other end portions of the piezoelectric element and the support member to allow the operating portion to be displaced, in response to an expansion/contraction of the piezoelectric element, along a displacement direction which differs from both the first longitudinal direction and the second longitudinal direction; and
a compression member attached to each of the base portion and the operating portion so as to compress the piezoelectric element along the first longitudinal direction,
wherein the first longitudinal direction and the second longitudinal direction intersect at a side of the operating portion, and
wherein the compression member is disposed outside of a space surrounded by the piezoelectric element, the support member and the base portion.

2. The displacement magnifying mechanism according to claim 1, wherein a rigidity of the piezoelectric element along the first longitudinal direction is equal to or less than a rigidity of the support member along the second longitudinal direction.

3. The displacement magnifying mechanism according to claim 1, wherein a connecting member is provided for connecting the end portion of the piezoelectric element and the base portion wherein the connecting member is formed with a material of which a thermal expansion coefficient is higher than that of the support member.

4. The displacement magnifying mechanism according to claim 1, wherein a second connecting member is provided for connecting the other end portion of the piezoelectric element and the operating portion, and wherein the second connecting member is formed with a material of which a thermal expansion coefficient is higher than that of the support member.

5. The displacement magnifying mechanism according to claim 1, wherein a rigidity of the support member along the displacement direction is equal to or less than a rigidity of the piezoelectric element along the displacement direction.

6. The displacement magnifying mechanism according to claim 1, wherein in a cross section of the support member as viewed from the second longitudinal direction, a cross-sectional secondary moment about a central axis which is perpendicular to the displacement direction and passes through a center of the support member along the displacement direction differs depending on a position along the second longitudinal direction.

7. The displacement magnifying mechanism according to claim 1, wherein a hinge member is provided at least at one of the end portion of the piezoelectric element along the first longitudinal direction and the end portion of the support member along the second longitudinal direction so as to promote a deformation of the piezoelectric element and the support member along the displacement direction.

8. The displacement magnifying mechanism according to claim 1, wherein a hinge member is provided at least at one of the other end portion of the piezoelectric element along the first longitudinal direction and the other end portion of the support member along the second longitudinal direction so as to promote a deformation of the piezoelectric element and the support member along the displacement direction.

9. The displacement magnifying mechanism according to claim 1, wherein two compression members are respectively disposed at positions sandwiching the piezoelectric element and the support member therebetween.

10. The displacement magnifying mechanism according to claim 1, wherein the compression member extends along a third longitudinal direction which intersects with each of the first longitudinal direction and the second longitudinal direction when viewed in a plan view including the first longitudinal direction and the second longitudinal direction, and wherein the compression member is formed to be provided with an expansible member which is able to expand/contract along the third longitudinal direction.

11. The displacement magnifying mechanism according claim 1, wherein the compression member extends along the first longitudinal direction, and the compression member extending along the first longitudinal direction is formed to be provided with an expansible member which is able to expand/contract along the first longitudinal direction.

12. The displacement magnifying mechanism according to claim 1, wherein a tip of the operating portion has a flat surface.

13. The displacement magnifying mechanism according to claim 1, wherein the supporting member is integrally formed with the base portion and the operating portion.

14. A polishing device comprising:

a base portion adapted for serving as a base;

a piezoelectric element of which an end portion is attached to a mounting surface of the base portion, the piezoelectric element extending along a first longitudinal direction;

a support member of which an end portion is attached to the mounting surface side by side with the piezoelectric element, the support member extending along a second longitudinal direction which intersects with the first longitudinal direction;

an operating portion attached to each of other end portions of the piezoelectric element and the support member to allow the operating portion to be displaced, in response to an expansion/contraction of the piezoelectric element, along a displacement direction which differs from both the first longitudinal direction and the second longitudinal direction;

a compression member attached to each of the base portion and the operating portion so as to compress the piezoelectric element along the first longitudinal direction; and a polishing portion provided on a surface of the operating portion opposite to a surface to which the piezoelectric element and the support member are attached, wherein the first longitudinal direction and the second longitudinal direction intersect at a side of the operating portion, and wherein the compression member is disposed outside of a space surrounded by the piezoelectric element, the support member and the base portion.

15. An actuator comprising:

a base portion adapted for serving as a base;

a piezoelectric element of which an end portion is attached to a mounting surface of the base portion, the piezoelectric element extending along a first longitudinal direction;

a support member of which an end portion is attached to the mounting surface side by side with the piezoelectric element, the support member extending along a second longitudinal direction which intersects with the first longitudinal direction;

an operating portion attached to each of other end portions of the piezoelectric element and the support member to allow the operating portion to be displaced, in response to an expansion/contraction of the piezoelectric element, along a displacement direction which differs from both the first longitudinal direction and the second longitudinal direction;

a compression member attached to each of the base portion and the operating portion so as to compress the piezoelectric element along the first longitudinal direction; and a driver for supplying a voltage or a current to the piezoelectric element and the support member so as to generate an expansion/contraction of the piezoelectric element, wherein the first longitudinal direction and the second longitudinal direction intersect at a side of the operating portion, and wherein the compression member is disposed outside of a space surrounded by the piezoelectric element, the support member and the base portion.

16. The actuator according to claim 15, wherein the actuator is configured to drive a working element which is adapted for processing the electronic component.

17. The actuator according to claim 15, wherein the actuator is configured to drive a probe which is adapted for measuring a characteristic of the electronic component by contacting to the electronic component.

18. A dispenser using the actuator according to claim 15, comprising:

a liquid outlet for introducing a liquid therein and for discharging the introduced liquid;

a valve for switching between discharging a liquid from the liquid outlet and shutting off the discharge of the liquid; and the actuator according to claim 15 for driving the valve.

19. An air valve using the actuator according to claim 15, comprising:

a valve main body having an air pressure chamber for introducing a compressed air therein and an air outlet through which the air pressure chamber is connected to outside;

a valve body provided in the air pressure chamber for switching between closing the air outlet and opening the air outlet; and the actuator according to claim 15 provided in the air pressure chamber for driving the valve body.

20. The actuator according to claim 15, wherein the supporting member is integrally formed with the base portion and the operating portion.

* * * * *